(12) United States Patent
Huang et al.

(10) Patent No.: US 11,621,916 B2
(45) Date of Patent: Apr. 4, 2023

(54) INFORMATION TRANSMISSION METHOD AND DEVICE IN IAB ARCHITECTURE

(71) Applicant: ZTE CORPORATION, Guangdong (CN)

(72) Inventors: Ying Huang, Guangdong (CN); Lin Chen, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 220 days.

(21) Appl. No.: 17/054,243

(22) PCT Filed: May 10, 2019

(86) PCT No.: PCT/CN2019/086398
§ 371 (c)(1),
(2) Date: Nov. 10, 2020

(87) PCT Pub. No.: WO2019/214709
PCT Pub. Date: Nov. 14, 2019

(65) Prior Publication Data
US 2021/0099385 A1    Apr. 1, 2021

(30) Foreign Application Priority Data

May 10, 2018   (CN) .......................... 201810445327.8

(51) Int. Cl.
*H04L 12/741*    (2013.01)
*H04L 45/74*    (2022.01)
(Continued)

(52) U.S. Cl.
CPC .......... *H04L 45/74* (2013.01); *H04B 7/0413* (2013.01); *H04L 69/22* (2013.01); *H04W 76/12* (2018.02)

(58) Field of Classification Search
CPC ....... H04L 45/74; H04L 69/22; H04B 7/0413; H04B 7/022; H04B 7/15528; H04W 76/12; H04W 40/02; H04W 72/1205
See application file for complete search history.

(56) References Cited

U.S. PATENT DOCUMENTS

2011/0044279 A1    2/2011   Johansson et al.
2012/0140697 A1    6/2012   Chen et al.
(Continued)

FOREIGN PATENT DOCUMENTS

CN    101998657 A    3/2011
CN    103582161 A    2/2014
(Continued)

OTHER PUBLICATIONS

Notice of Reasons for Refusal for corresponding Japanese Patent Application No. 2020-563654, dated Dec. 23, 2021.
(Continued)

*Primary Examiner* — Walli Z Butt
(74) *Attorney, Agent, or Firm* — KDB Firm PLLC

(57) ABSTRACT

Provided is an information transmission method and apparatus. The method includes: in an IAB scenario, an integrated access and backhaul (IAB) node acquiring a first data packet; and a first IAB node sending the first data packet to an IAB donor. Further provided are an information acquisition method and apparatus, a storage medium and an electronic apparatus.

8 Claims, 8 Drawing Sheets

(51) Int. Cl.
*H04W 76/12* (2018.01)
*H04B 7/0413* (2017.01)
*H04L 69/22* (2022.01)

(56) References Cited

U.S. PATENT DOCUMENTS

| | | | |
|---|---|---|---|
| 2018/0103393 | A1 | 4/2018 | Wang |
| 2020/0413457 | A1* | 12/2020 | Hong ............... H04W 76/10 |
| 2021/0014768 | A1* | 1/2021 | Hong ............... H04W 40/22 |
| 2021/0243672 | A1* | 8/2021 | Deshmukh ......... H04W 40/248 |

FOREIGN PATENT DOCUMENTS

| | | |
|---|---|---|
| CN | 107534852 A | 1/2018 |
| CN | 107736004 A | 2/2018 |
| JP | 2021518697 A | 8/2021 |

OTHER PUBLICATIONS

AT&T, On backhauling of F1-U and F1-C for IAB with L2 relaying [Online] 3GPP TSG-RAN WG3 #99bis, Sanya, China, Apr. 16-Apr. 20, 2018, R3-182297.

ZTE. "Discussion on IAB Architectures" 3GPP TSG-RAN WG2 Meeting #101 bis R2-1804782, Apr. 20, 2018.

ZTE. "Discussion on IAB Architectures" 3GPP TSG-RAN WG2 Meeting #101 bis R2-181829, Apr. 20, 2018.

Huawei. "Overview on Support of IAB" 3GPP TSG-RAN WG3 #99 R3-180815, Mar. 2, 2018.

International Search Report for the Application No. PCT/CN2019/086398, dated Jul. 25, 2019, 2 pages.

First Office Action for the Chinese Patent Application No. 2018104453278, dated Nov. 3, 2021, 15 pages.

First Search Report for the Chinese Patent Application No. 2018104453278, dated Nov. 3, 2021, 3 pages pages.

Ericsson, "Protocol Stack for IAB Architecture 1a and 1b" 3GPP TSG-RAN WG3 #99bis—Sanya, P.R. China,—R3-182247—Apr. 16-20, 2018, 6 pages.

Qualcomm Incorporated, "IAB—U-plane transport for L2-relaying" 3GPP TSG-RAN WG3 #99bis—Sanya, P.R. China,—R3-181945, 8 pages.

Nokia, "Architecture and Protocols: MAC adaption layer based IAB" 3GPP TSG-RAN WG3 #99bis—Sanya, P.R. China,—R3-182103, 6 pages.

Partial European Search Report for the European Patent Application No. 19/799,724, dated Dec. 20, 2021, 15 pages.

* cited by examiner

INFORMATION TRANSMISSION METHOD AND DEVICE IN IAB ARCHITECTURE

CROSS-REFERENCE TO RELATED APPLICATIONS

This is a National Stage Application, filed under 35 U.S.C. 371, of International Patent Application No. PCT/CN2019/086398, filed on May 10, 2019, which claims priority to Chinese Patent Application No. 201810445327.8 filed with the CNIPA on May 10, 2018, the disclosures of which are incorporated herein by reference in their entireties.

TECHNICAL FIELD

The present application relates to the field of communication, for example, to an information transmission method and apparatus.

BACKGROUND

In the related art, the use of a larger available bandwidth in new radio (NR) compared with the LTE system, the use of a large-scale distributed antenna massive MIMO, and the use of multi-beam make it possible to study and apply integrated access and backhaul (IAB) links. Through radio backhaul links and relay links, dense NR cell networks can be deployed more flexibly without dense deployment of increasing transmission networks accordingly. An example of a network in which integrated access and backhaul links are deployed is shown in FIG. 1. FIG. 1 is a schematic diagram illustrating an IAB scenario in the related art. As shown in FIG. 1, A, B and C are all access nodes. A user equipment (UE) may access nodes A, B and C through access links, but only access node A has a wired connection with a core network, and access nodes B and C have no wired connection with a core network element. It needs to be solved is how to relay and forward control signaling in an integrated access and backhaul (IAB) architecture such that the control signaling can be correctly transmitted and received.

No effective scheme has been proposed for information transmission in the IAB architecture of the new system.

SUMMARY

The present application provides an information transmission method and apparatus to at least suitable for information transmission in the IAB architecture of the new system.

According to the present application, an information transmission method is provided and includes the following steps: a first integrated access and backhaul (IAB) node acquires a first data packet; and the first IAB node sends the first data packet to an IAB donor.

According to the present application, a method for transmitting IAB control plane information is provided and includes the following steps: an IAB donor distributed unit (DU) receives a control plane data packet sent by a first IAB node; and the IAB donor DU sends the control plane data packet to a target centralized unit (CU) or a target CU-control plane (CP), or forwards the control plane data packet to the target CU-CP through a CU-user plane (UP).

According to the present application, an information transmission method is further provided and includes the following steps: an integrated access and backhaul (IAB) donor receives or generates a second data packet; and the IAB donor sends the second data packet to a fourth IAB node through a one-hop node or a multi-hop node.

According to the present application, an information acquisition method is further provided and includes the following steps: a first integrated access and backhaul (IAB) node obtains first configuration information, where the first configuration information includes at least one of: target node information; next-hop node information; or routing path information; and the first IAB node determines, according to the first configuration information, a next-hop node to which a data packet is forwarded. According to the present application, an information acquisition method is further provided and includes the following steps: an integrated access and backhaul (IAB) donor distributed unit (DU) obtains second configuration information, where the second configuration information includes at least one of: a mapping relationship between a UE identifier and an F1AP ID; a mapping relationship between a signaling radio bearer (SRB) of a UE and an F1AP ID; a mapping relationship between a UE identifier and a CU identifier; a mapping relationship between an Internet Protocol (IP) address and target node information; a mapping relationship between a UE identifier and a CU-CP identifier; a mapping relationship between a UE identifier and a base station identifier; a mapping relationship between a UE identifier and an IAB node identifier; a mapping relationship between an F1 general packet radio service (GPRS) tunneling protocol-user plane (GTP-U) tunnel and CU-CP node information; a mapping relationship between an F1 GTP-U tunnel and target node information; a mapping relationship between a UE identifier and target node information; or a mapping relationship between an SRB of a UE and an F1 GTP-U tunnel; and the IAB donor DU forwards a data packet according to the second configuration information.

According to the present application, an information acquisition method is further provided. The method includes steps described below.

An integrated access and backhaul (IAB) donor centralized unit (CU)-user plane (UP) obtains configuration information, where the configuration information includes at least one of:
  a mapping relationship between a UE identifier and an F1AP ID;
  a mapping relationship between a signaling radio bearer (SRB) of a UE and an F1AP ID;
  a mapping relationship between a UE identifier and a CU identifier;
  a mapping relationship between an IP address of a received data packet and target node information;
  a mapping relationship between a UE identifier and a CU-CP identifier;
  a mapping relationship between a UE identifier and a base station identifier/an IP address;
  a mapping relationship between a UE identifier and an IAB node identifier;
  a mapping relationship between an F1 GTP-U tunnel and CU-CP node information;
  a mapping relationship between an SRB of a UE and an F1 GTP-U tunnel;
  a mapping relationship between an F1 GTP-U tunnel and target node information; or
  a mapping relationship between a UE identifier and target node information.

The IAB donor CU-UP forwards a data packet according to the configuration information.

According to the present application, an information transmission method is further provided and includes transmitting a data packet between an IAB donor CU-UP and an IAB donor DU, where the data packet includes a GTP-U header, and the GTP-U header includes at least one of: UE identifier information; bearer identifier information; target node information; control plane indication information; user plane indication information; routing path information; QoS-related information; GTP tunnel information; F1AP ID information; or protocol type indication information.

According to the present application, an information transmission method is further provided and includes transmitting an F1AP message between an IAB donor DU and an IAB donor CU-CP, where the F1AP message includes at least one of: UE identifier information; bearer identifier information; target node information; control plane indication information; user plane indication information; routing path information; QoS-related information; GTP tunnel information; F1AP ID information; or protocol type indication information.

According to the present application, an information transmission method is further provided and includes transmitting an E1AP message between an IAB donor CU-UP and an IAB donor CU-CP, where the E1AP message includes at least one of: UE identifier information; bearer identifier information; target node information; control plane indication information; user plane indication information; routing path information; QoS-related information; GTP tunnel information; F1AP ID information; or protocol type indication information.

According to the present application, an information transmission apparatus is further provided and is applied to a first integrated access and backhaul (IAB) node. The apparatus includes a first acquisition module configured to acquire a first data packet and a first sending module configured to send the first data packet to an IAB donor.

According to the present application, an apparatus for transmitting IAB control plane information is further provided and is applied to an IAB donor distributed unit (DU). The apparatus includes a second receiving module configured to receive a control plane data packet sent by a first IAB node and a second sending module configured to send the control plane data packet to a target centralized unit (CU) or a target CU-control plane (CP), or forward the control plane data packet to the target CU-CP through a CU-user plane (UP).

According to the present application, an information transmission apparatus is further provided and is applied to an integrated access and backhaul (IAB) donor. The apparatus includes a first determination module configured to receive a second data packet or generate a second data packet and a third sending module configured to send the second data packet to a fourth IAB node through a one-hop node or a multi-hop node.

According to the present application, an information acquisition apparatus is further provided and is applied to a first integrated access and backhaul (IAB) node. The apparatus includes a second acquisition module configured to obtain first configuration information and a second determination module configured to determine, according to the first configuration information, a next-hop node to which a data packet is forwarded. The first configuration information includes at least one of: target node information; next-hop node information; or routing path information.

According to the present application, an apparatus for acquiring IAB control plane information is further provided and is applied to an integrated access and backhaul (IAB) donor distributed unit (DU). The apparatus includes a third acquisition module configured to obtain second configuration information and a third determination module configured to forward a data packet according to the second configuration information. The second configuration information includes at least one of: a mapping relationship between a UE identifier and an F1AP ID; a mapping relationship between a signaling radio bearer (SRB) of a UE and an F1AP ID; a mapping relationship between a UE identifier and a CU identifier; a mapping relationship between an Internet Protocol (IP) address and target node information; a mapping relationship between a UE identifier and a CU-CP identifier; a mapping relationship between a UE identifier and a base station identifier; a mapping relationship between a UE identifier and an IAB node identifier; a mapping relationship between an F1 GTP-U tunnel and CU-CP node information; a mapping relationship between an F1 GTP-U tunnel and target node information; a mapping relationship between a UE identifier and target node information; or a mapping relationship between an SRB of a UE and an F1 GTP-U tunnel.

According to the present application, an apparatus for acquiring IAB control plane information is further provided and is applied to an integrated access and backhaul (IAB) donor centralized unit (CU)-user plane (UP). The apparatus includes a fourth acquisition module configured to acquire third configuration information and a forwarding module configured to forward a data packet according to the third configuration information. The third configuration information includes at least one of: a mapping relationship between a UE identifier and an F1AP ID; a mapping relationship between a signaling radio bearer (SRB) of a UE and an F1AP ID; a mapping relationship between a UE identifier and a CU identifier; a mapping relationship between an IP address of a received data packet and target node information; a mapping relationship between a UE identifier and a CU-CP identifier; a mapping relationship between a UE identifier and a base station identifier/an IP address; a mapping relationship between a UE identifier and an IAB node identifier; a mapping relationship between an F1 GTP-U tunnel and CU-CP node information; a mapping relationship between an SRB of a UE and an F1 GTP-U tunnel; a mapping relationship between an F1 GTP-U tunnel and target node information; or a mapping relationship between a UE identifier and target node information.

According to the present application, an information transmission apparatus is further provided and is applied to an IAB donor CU-UP or an IAB donor DU. The apparatus includes a first transmission module configured to transmit a data packet between the IAB donor CU-UP and the IAB donor DU, where the data packet includes a GTP-U header, and the GTP-U header includes at least one of: UE identifier information; bearer identifier information; target node information; control plane indication information; user plane indication information; routing path information; QoS-related information; GTP tunnel information; F1AP ID information; or protocol type indication information.

According to the present application, an information transmission apparatus is further provided and is applied to an IAB donor DU or an IAB donor CU-CP. The apparatus includes a second transmission module configured to transmit an F1AP message between the IAB donor DU and the IAB donor CU-CP, where the F1AP message includes at least one of: UE identifier information; bearer identifier information; target node information; control plane indication information; user plane indication information; routing path information; QoS-related information; GTP tunnel information; F1AP ID information; or protocol type indication information.

According to the present application, an information transmission apparatus is further provided and is applied to an IAB donor CU-UP or an IAB donor CU-CP. The apparatus includes a third transmission module configured to transmit an E1AP message between the IAB donor CU-UP and the IAB donor CU-CP, where the E1AP message includes at least one of: UE identifier information; bearer identifier information; target node information; control plane indication information; user plane indication information; routing path information; QoS-related information; GTP tunnel information; F1AP ID information; or protocol type indication information.

According to the present application, a storage medium is further provided. The storage medium is configured to store a computer program, where the computer program, when executed, performs the method described in any embodiment described above.

According to the present application, an electronic apparatus is further provided, and includes a memory and a processor. The memory is configured to store a computer program, and the processor is configured to execute the computer program to perform the method described in any embodiment described above.

According to the present application, in the IAB scenario, the IAB node acquires the first data packet, and the first IAB node sends the first data packet to the IAB donor. The above scheme is suitable for information transmission in the IAB architecture of the new system, and the IAB node transmitting information to the IAB donor is achieved.

BRIEF DESCRIPTION OF DRAWINGS

The drawings described herein are used to provide a further understanding of the present application and form a part of the present application. The exemplary embodiments and descriptions thereof in the present application are used to explain the present application and not to limit the present application in any improper way. In the drawings.

DETAILED DESCRIPTION

Hereinafter, the present application will be described in detail with reference to drawings and in conjunction with embodiments. It is to be noted that if not in collision, the embodiments described herein and features in the embodiments may be combined with each other.

It is to be noted that the terms "first", "second" and the like in the description, claims and drawings of the present application are used to distinguish between similar objects and are not necessarily used to describe a particular order or sequence.

Embodiments of the present application provide a mobile communication network (which includes, but is not limited to, a 5G mobile communication network). A network side device (such as a base station) and a terminal may be included in the network architecture of the network. The embodiment provides an information transmission method executable on the above network architecture. It is to be noted that an execution environment of the above information transmission method provided by the embodiment of the present application is not limited to the above network architecture. The IAB node (s) in the present application may be part or all of the devices of the base station. F1AP and E1AP in the present application are terms in the 3GPP standard.

Embodiment One

Figure 1:
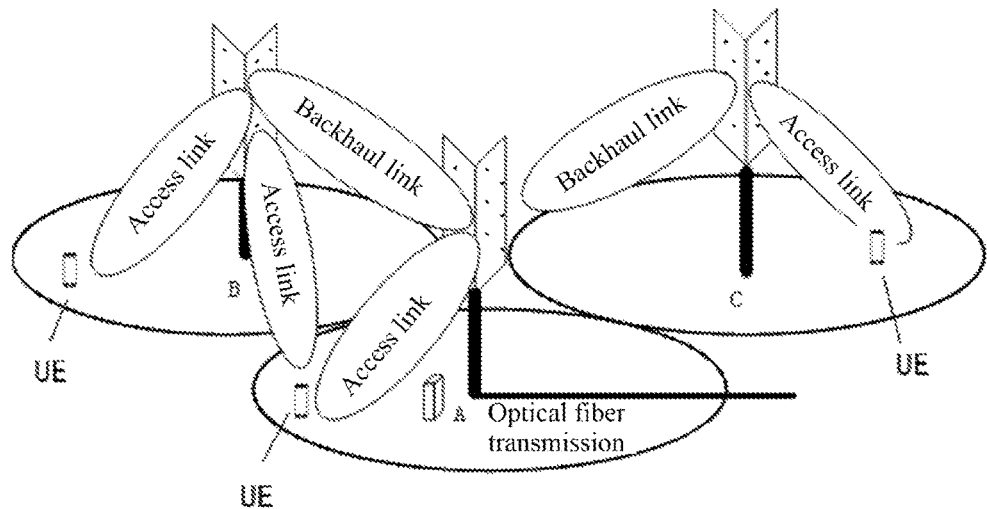
FIG. 1 is a schematic diagram illustrating an IAB scenario in the related art.
Figure 2:
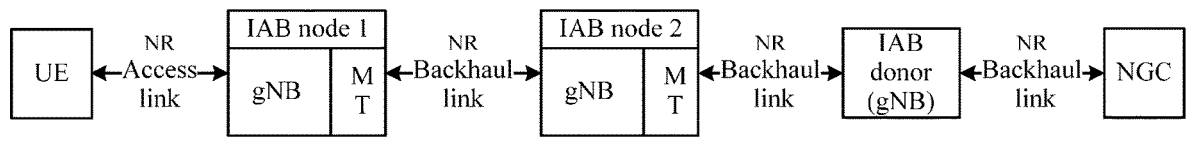
FIG. 2 is a schematic diagram illustrating non-separation of a CU and a DU in an IAB deployment scenario in the related art.
Figure 3:
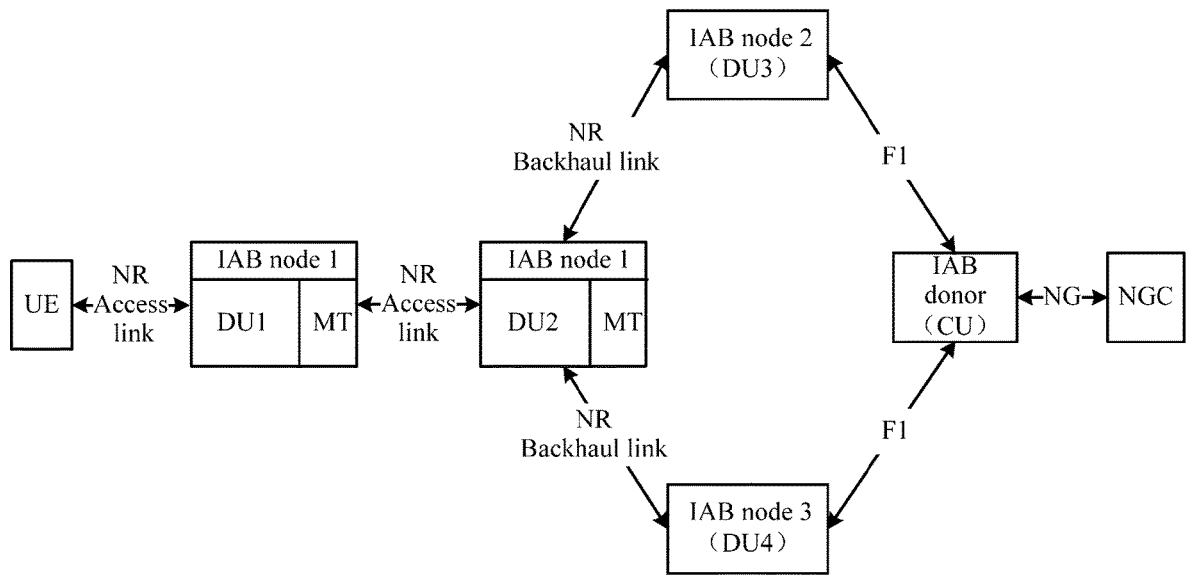
FIG. 3 is a schematic diagram illustrating separation of a CU and a DU in an IAB deployment scenario in the related art.

The application scenario of the present application is shown in FIG. 1. An access node that supports random access of a user equipment (UE) and that performs radio backhaul on user plane data packets or control plane data packets is referred to as an IAB node. The access node that provides a radio backhaul function for the IAB node to connect the UE to the core network is referred to as an IAB donor. User plane or control plane data packets may be transmitted between access nodes through radio backhaul links. For example, access node B may send a data packet received from the UE to access node A through a radio backhaul link, and then access node A sends the data packet from the UE to a core network element. For a downlink, the core network element may send a UE data packet to access node A, access node A sends the UE data packet to access node B through a radio backhaul link, and then access node B sends the UE data to the UE through an access link. The access link and the backhaul link may use the same carrier frequency or different carrier frequencies. In addition, user plane or control plane data packets may be transmitted through a multi-hop relay backhaul link between the access node and the core network element. FIG. 2 is a schematic diagram illustrating non-separation of a CU and a DU in an IAB deployment scenario in the related art. As shown in FIG. 2, an uplink data packet from the UE may be sent to the IAB donor through two IAB nodes and then to the 5G core network (NGC). On the other hand, the support for separation deployment of the CU and the DU is an important technical feature in NR. FIG. 3 is a schematic diagram illustrating separation of a CU and a DU in an IAB deployment scenario in the related art. As shown in FIG. 3, gNB is comprised of centralized unit (CU) and distributed unit (DU) logic functions, so IAB functions also need to be supported in the deployment scenario where the CU and the DU are separated. In addition, the CU may also be comprised of control plane (also referred to as CU-CP) and user plane (also referred to as CU-UP) logic functions.

Figure 4:
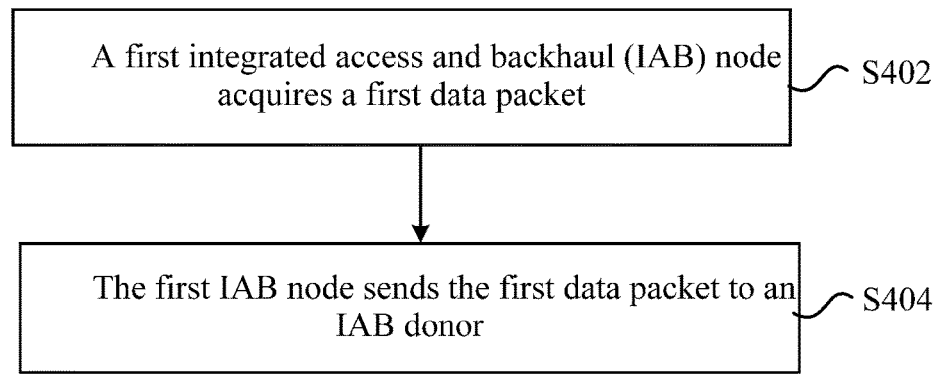
FIG. 4 is a flowchart illustrating an information transmission method according to an embodiment of the present application.

This embodiment provides an information transmission method executable in the IAB scenario. FIG. 4 is a flowchart illustrating an information transmission method according to an embodiment of the present application. As shown in FIG. 4, the method includes steps described below.

In step S402, a first integrated access and backhaul (IAB) node acquires a first data packet.

In step S404, the first IAB node sends the first data packet to an IAB donor.

According to the above steps, in the IAB scenario, the IAB node acquires the first data packet, and the first IAB node sends the first data packet to the IAB donor. The above scheme is suitable for information transmission in the IAB architecture of the new system, achieving that the IAB node transmits information to the IAB donor.

Alternatively, step S402 and step S404 may be performed in a reverse order, that is, step S404 may be performed before step S402.

Alternatively, the step in which the first IAB node acquires the first data packet includes one of the following steps: the first IAB node receives the first data packet sent by a UE; the first IAB node generates the first data packet; or the first IAB node receives the first data packet sent by a second IAB node. Here, three forms in which the IAB acquires the first data packet are exemplified, and are not intended to limit the present application.

Alternatively, the step in which the first IAB node sends the first data packet to the IAB donor includes one of the following steps: the first IAB node sends the first data packet to the IAB donor; or the first IAB node sends the first data packet to a next-hop node and the next-hop node forwards the first data packet to the IAB donor. The step in which the first IAB node sends the first data packet to the IAB donor may be understood as a step in which the first IAB node directly sends the first data packet to the IAB donor without forwarding through an intermediate one-hop node or multi-hop node.

Alternatively, the step in which the first IAB node sends the first data packet to the IAB donor includes one of the following steps: the first IAB node sends the first data packet to the IAB donor through a control plane logical channel or a control plane bearer; or the first IAB node sends the first data packet to the IAB donor through a user plane logical channel or a user plane bearer.

Alternatively, after the first IAB node acquires the first data packet, the first IAB node adds an adaptor layer header to the first data packet, where the adaptor layer header includes at least one of: target node information; a UE identifier of the first data packet; a bearer identifier of the first data packet; a channel identifier of the first data packet; routing path information; Quality of service (QoS) information; GPRS tunneling protocol (GTP) tunnel information; F1AP ID information (where the ID information may be identifier information); control plane indication information; user plane indication information; protocol type indication information, long-format indication information, or short-format indication information.

It is to be added that the IAB donor or IAB node to which a data packet is finally sent is referred to as a target node, and a node between a current IAB node and the target node may be referred to as the one-hop node or multi-hop node.

Alternatively, the target node information includes, but is not limited to, a target node identifier such as an IAB node identifier, a DU identifier, a CU identifier, a base station identifier, a CU-UP identifier, a CU-CP identifier, an AMF identifier, a cell identifier and a target index number; or the IP address of the target node; or the IP address index information of the target node; or next-hop node information.

Alternatively, the UE identifier information of the data packet is the UE identifier of the UE to which the data packet belongs or the UE identifier of the IAB node to which the data packet belongs; further, the UE identifier includes, but is not limited to, an E1AP ID, an F1AP ID, a cell radio network temporary identifier (C-RNTI), an S1 AP ID, an X2 AP ID, an NG AP ID, an Xn AP ID, and a newly defined identifier.

Alternatively, the bearer/channel identifier information of the data packet is the identifier of the bearer/channel of the UE to which the data packet belongs, or the identifier of the bearer/channel of the IAB node to which the data packet belongs. The bearer identifier is one of: a DRB ID, an SRB ID, an LCID, a Quality of Service (QoS) flow identifier (QFI), or a flow identifier.

Alternatively, the routing path information includes, but is not limited to, a routing path identifier, a routing path number, and a routing path index number.

Alternatively, the QoS-related information includes, but is not limited to, a QoS class identifier (QCI), 5th-Generation QoS indicator (5QI), QFI, or differentiated services code point (DSCP) value.

Alternatively, the GTP tunnel information includes a transport network layer (TNL) address and/or GTP tunnel end point identifier (TEID) information.

Alternatively, the protocol type indication information includes, but is not limited to, an RRC message, an NAS message, an F1AP message, and OAM information.

Alternatively, the long-format indication information is used for indicating that the adaptor layer header includes information other than the long-format indication information; the short-format indication information is used for indicating that the adaptor layer header includes only the short-format indication information.

Alternatively, before the first IAB node adds the adaptor layer header to the first data packet, the method further includes the first IAB node encapsulates the first data packet into an F1AP message, where the encapsulated FLAP message includes at least one of: an F1AP ID, the UE identifier of the first data packet, the bearer identifier of the first data packet, or the channel identifier of the first data packet. The UE identifier of the first data packet may be the identifier of the UE that sends the first data packet or UE that generates the first data packet.

Alternatively, the IAB donor includes at least one of: an IAB donor base station; an IAB donor centralized unit (CU);

an IAB donor distributed unit (DU); an IAB donor CU-user plane (UP); or an IAB donor CU-control plane (CP).

Alternatively, the first data packet is a user plane data packet or a control plane data packet, and may specifically be an NAS message, an RRC message, an F1 message, S1 signaling, X2 signaling, NG signaling, Xn signaling, or OAM information.

According to another embodiment of the present application, a method for transmitting IAB control plane information is further provided and includes steps described below.

In step one, an IAB donor distributed unit (DU) receives a control plane data packet sent by a first IAB node.

In step two, the IAB donor DU sends the control plane data packet to a target centralized unit (CU) or a target CU-control plane (CP), or forwards the control plane data packet to the target CU-CP through a CU-user plane (UP).

With the above scheme, the manner, suitable for the new system, of the IAB donor DU sending the control plane data packet is given.

According to another embodiment of the present application, an information transmission method is further provided and includes steps described below.

In step one, an integrated access and backhaul (IAB) donor receives or generates a second data packet.

In step two, the IAB donor sends the second data packet to a fourth IAB node through a one-hop node or a multi-hop node.

The fourth IAB node in the above step two may be used for indicating different IAB nodes and has no actual network architecture meaning.

With the above scheme, the manner, suitable for the new system, of the IAB donor sending the second data packet is given.

Alternatively, the step in which the IAB donor sends the second data packet to the fourth IAB node through the one-hop node or the multi-hop node includes the following step: the IAB donor sends the second data packet through an F1 GTP-U data packet, an F1AP message or an E1AP message, and a next-hop node forwards the second data packet to the fourth IAB node.

Alternatively, the F1 GTP-U data packet, the F1AP message or the E1AP message includes at least one of: target node information; a UE identifier of the second data packet; a bearer identifier of the second data packet; a channel identifier of the second data packet; routing path information; QoS information; GTP tunnel information; F1AP ID information; control plane indication information; user plane indication information; or protocol type indication information.

Alternatively, after the IAB donor sends the second data packet through the F1 GTP-U data packet, the F1AP message or the E1AP message to the next-hop node, the next-hop node adds an adaptor layer header to the data packet, where the adaptor layer header includes at least one of: target node information; a UE identifier of the second data packet; a bearer identifier of the second data packet; a channel identifier of the second data packet; routing path information; QoS-related information; GTP tunnel information; F1AP ID information; control plane indication information; user plane indication information; or protocol type indication information.

Alternatively, the target node information includes, but is not limited to, a target node identifier such as an IAB node identifier, a DU identifier, a CU identifier, a base station identifier, a CU-UP identifier, a CU-CP identifier, an AMF identifier, a cell identifier
and a target index number; or
the IP address of the target node; or
the IP address index information of the target node; or
next-hop node information.

Alternatively, the UE identifier information of the data packet is the UE identifier of the UE to which the data packet belongs or the UE identifier of the IAB node to which the data packet belongs; further, the UE identifier includes, but is not limited to, an E1AP ID, an F1AP ID, a C-RNTI, an S1 AP ID, an X2 AP ID, an NG AP ID, an Xn AP ID, and a newly defined identifier.

Alternatively, the bearer/channel identifier information of the data packet is the identifier of the bearer/channel of the UE to which the data packet belongs, or the identifier of the bearer/channel of the IAB node to which the data packet belongs. The bearer identifier is one of: a DRB ID, an SRB ID, an LCID, a QFI, or a flow identifier.

Alternatively, the routing path information includes, but is not limited to, a routing path identifier, a routing path number, and a routing path index number.

Alternatively, the QoS-related information includes, but is not limited to, a QCI, 5QI, QFI, or DSCP value.

Alternatively, the GTP tunnel information includes a TNL address and/or GTP TEID information.

Alternatively, the protocol type indication information includes, but is not limited to, a radio resource control (RRC) message, a non-access stratum (NAS) message, an F1AP message, and operation administration and maintenance (OAM) information.

According to another embodiment of the present application, an information acquisition method is further provided and includes steps described below.

In step one, an integrated access and backhaul (IAB) node obtains first configuration information, where the first configuration information includes at least one of: target node information; next-hop node information; routing path information; or a mapping relationship between a differentiated services code point (DSCP) and a QFI flow ID (QFI).

The target node information in the present application may all be the target node information in the adaptor layer described in the aforementioned embodiment. The first configuration information is configured at the granularity of a UE or at the granularity of a bearer.

In step two, the first IAB node determines, according to the first configuration information, a next-hop node to which a data packet is forwarded. The next-hop node here may be a one-hop node or multi-hop node between the first IAB node and the target node, or may be the target node.

Alternatively, the step in which the IAB node obtains the first configuration information includes the IAB node obtains the first configuration information from a CU or a CU-CP through an F1 message.

According to another embodiment of the present application, an information acquisition method is further provided and includes steps described below.

In step one, an integrated access and backhaul (IAB) donor distributed unit (DU) obtains second configuration information, where the second configuration information includes at least one of:
a mapping relationship between F1AP IDs;
a mapping relationship between a DSCP and a QFI;
a mapping relationship between a UE identifier and an F1AP ID;

a mapping relationship between a signaling radio bearer (SRB) of a UE and an F1AP ID, where what is to be added is that the IAB donor DU can determine, according to such mapping relationship, the corresponding F1AP ID according to a UE identifier or the corresponding UE identifier according to an F1AP ID;

a mapping relationship between a UE identifier and a CU identifier, where the CU identifier may be information such as a base station identifier, a CU identifier and an IP address;

a mapping relationship between an IP address and target node information, where the IP address here may be the target IP address in an IP header;

a mapping relationship between a UE identifier and a CU-CP identifier, where the CU-CP identifier may be information such as a base station identifier, a CU-CP identifier and an IP address;

a mapping relationship between a UE identifier and a base station identifier, which may also be a mapping relationship between a UE identifier and an IP address;

a mapping relationship between a UE identifier and an IAB node identifier, where the IAB node identifier may be information such as a base station identifier, a DU identifier and an IP address;

a mapping relationship between an F1 GTP-U tunnel and CU-CP node information, where the F1 GTP-U tunnel may be the F1 GTP-U tunnel of the data packet received by the IAB donor DU;

a mapping relationship between an F1 GTP-U tunnel and target node information;

a mapping relationship between a UE identifier and target node information; or a mapping relationship between an SRB of a UE and an F1 GTP-U tunnel.

The IAB donor DU forwards a data packet according to the second configuration information.

Alternatively, the step in which the integrated access and backhaul distributed unit (IAB donor DU) obtains the second configuration information includes the IAB donor DU obtains the second configuration information from a CU or a CU-CP through an F1 message.

According to another embodiment of the present application, an information acquisition method is further provided and includes steps described below.

An integrated access and backhaul (IAB) donor centralized unit (CU)-user plane (UP) obtains third configuration information, where the third configuration information includes at least one of:

a mapping relationship between a UE identifier and an F1AP ID;

a mapping relationship between a signaling radio bearer (SRB) of a UE and an F1AP ID;

a mapping relationship between a UE identifier and a CU identifier, where the CU identifier may be information such as a base station identifier, a CU identifier and an IP address;

a mapping relationship between an IP address of a received data packet and target node information;

a mapping relationship between a UE identifier and a CU-CP identifier, where the CU-CP identifier may be information such as a base station identifier, a CU-CP identifier and an IP address;

a mapping relationship between a UE identifier and a base station identifier/an IP address;

a mapping relationship between a UE identifier and an IAB node identifier, where the IAB node identifier may be information such as a base station identifier, a DU identifier and an IP address;

a mapping relationship between an F1 GTP-U tunnel and CU-CP node information;

a mapping relationship between an SRB of a UE and an F1 GTP-U tunnel;

a mapping relationship between an F1 GTP-U tunnel and target node information; or a mapping relationship between a UE identifier and target node information.

In step two, the IAB donor CU-UP forwards a data packet according to the third configuration information.

With the above scheme, the scheme, suitable for new radio (NR), of the IAB donor CU-UP sending a data packet according to configuration information is given.

Alternatively, the step in which the IAB donor CU-UP obtains the third configuration information includes the IAB donor CU-UP obtains the third configuration information from a CU-CP through an E1 message.

According to another embodiment of the present application, an information transmission method is further provided and includes steps described below.

In step one, a data packet is transmitted between an IAB donor CU-UP and an IAB donor DU, where the data packet includes a GTP-U header, and the GTP-U header includes at least one of: UE identifier information; bearer identifier information; target node information; control plane indication information; user plane indication information; routing path information; QoS-related information; GTP tunnel information; F1AP ID information; or protocol type indication information.

With the above scheme, the scheme, suitable for new radio (NR), of transmitting a data packet between the IAB donor CU-UP and the IAB donor DU is given.

According to another embodiment of the present application, an information transmission method is further provided and includes steps described below.

In step one, an F1AP message is transmitted between an IAB donor DU and an IAB donor CU-CP, where the F1AP message includes at least one of: UE identifier information; bearer identifier information; target node information; control plane indication information; user plane indication information; routing path information; QoS-related information; GTP tunnel information; F1AP ID information; or protocol type indication information.

With the above scheme, the scheme, suitable for new radio (NR), of transmitting a data packet between the IAB donor DU and the IAB donor CU-CP is given.

According to another embodiment of the present application, an information transmission method is further provided and includes steps described below.

In step one, an E1AP message is transmitted between an IAB donor CU-UP and an IAB donor CU-CP, where the E1AP message includes at least one of: UE identifier information; bearer identifier information; target node information; control plane indication information; user plane indication information; routing path information; QoS-related information; GTP tunnel information; F1AP ID information; or protocol type indication information.

With the above scheme, the scheme, suitable for new radio (NR), of transmitting a data packet between the IAB donor CU-UP and the IAB donor CU-CP is given.

Further description is provided below in conjunction with several specific embodiments of the present application.

Specific Embodiment One: Method One for Sending an NAS/RRC Message Through a UP

The method in this specific embodiment is method one for forwarding the NAS/RRC message through the user plane.

Figure 5:
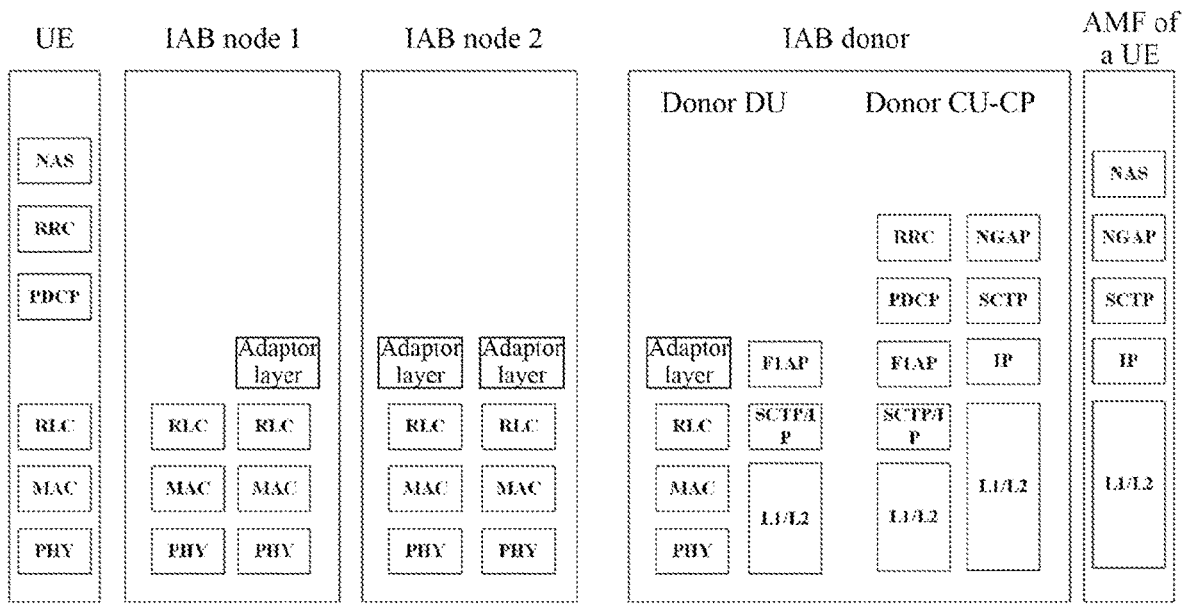
FIG. 5 is a schematic diagram illustrating a protocol stack between a UE and an AMF according to specific embodiment one.

FIG. 5 is a schematic diagram illustrating a protocol stack between a UE and an AMF according to specific embodiment one. As shown in FIG. 5, adaptor layers are located above radio link control (RLC) layers of IAB nodes and above an RLC layer of an IAB donor DU. It is to be noted that an adaptor layer/adaptation layer may also be located between an RLC layer and a media access control (MAC) layer, or an adaptor layer function is located in the RLC layer or the MAC layer. In addition, the donor CU-CP in FIG. 5 may also be a donor CU, and then the donor CU-CP in this specific embodiment is replaced by the donor CU.

An uplink data forwarding process using the method of this specific embodiment is described below. It is to be noted that steps described below may be used in any combination.

Step one: After the NAS/RRC message of the UE is sent to IAB node 1 through the SRB, IAB node 1 determines a next-hop node of the data packet according to UE context information (e.g., target node information and/or routing path information, the target node information including but not limited to: an CU identifier/address, or a donor DU identifier/address, or a CU-CP identifier/address, or a CU-UP identifier/address) configured (e.g., configured by a CU or a CU-CP). For example, the next-hop node in FIG. 5 is IAB node 2.

Then, IAB node 1 performs adaptor layer processing and encapsulation. The adaptor layer header includes at least one of: target node information, a UE identifier of a data packet, a bearer identifier of a data packet, a channel identifier of a data packet, routing path information, QoS-related information, GTP tunnel information, F1AP ID information, control plane indication information, user plane indication information, protocol type indication information, long-format indication information, or short-format indication information.

The target node information includes, but is not limited to, a target node identifier such as a DU identifier, a CU identifier, a base station identifier, a CU-UP identifier, a CU-CP identifier, an AMF identifier, a cell identifier and a target index number; or the IP address of the target node; or the IP address index information of the target node.

The UE identifier information of the data packet is the UE identifier of the UE to which the data packet belongs or the UE identifier of the IAB node to which the data packet belongs; further, the UE identifier includes, but is not limited to, an F1AP ID, a C-RNTI, an S1 AP ID, an X2 AP ID, an NG AP ID, an Xn AP ID, and a newly defined identifier.

The bearer/channel identifier information of the data packet is the identifier of the bearer/channel of the UE to which the data packet belongs, or the identifier of the bearer/channel of the IAB node to which the data packet belongs. The bearer identifier is one of: a DRB ID, an SRB ID, an LCID, a QFI, or a flow identifier.

The routing path information includes, but is not limited to, a routing path identifier, a routing path number, and a routing path index number.

The QoS-related information includes, but is not limited to, a QCI, 5QI, QFI, or DSCP value.

The GTP tunnel information includes a TNL address and/or GTP TEID information.

The protocol type indication information includes, but is not limited to, an RRC message, an NAS message, an F1AP message, and OAM information.

The long-format indication information is used for indicating that the adaptor layer header includes information other than the long-format indication information; the short-format indication information is used for indicating that the adaptor layer header includes only the short-format indication information.

Step two: IAB node 1 sends the NAS/RRC message data packet received from the UE to IAB node 2 through the DRB of IAB node 1 itself or through a user plane RLC channel. Alternatively, IAB node 1 sends the NAS/RRC message data packet received from the UE to IAB node 2 through the DRB dedicated to forwarding control plane signaling.

Step three: IAB node 2 sends the received data packet to the next-hop node according to information in an adaptor layer header.

Step four: Alternatively, after receiving the data packet from IAB node 2, the donor DU distinguishes between a control plane data packet and a user plane data packet by using the methods described below.

Distinguishing method one: If the donor DU receives the data packet from the DRB dedicated to forwarding control plane signaling, the data packet is a control plane signaling data packet.

Distinguishing method two: If the adaptor layer header includes control plane indication information or an SRB ID, the data packet is a control plane signaling data packet.

Alternatively, the donor DU may determine a target node of the data packet by using the method described below.

Determination method one: The CU-CP configures target CU-CP information for IAB node 1, and IAB node 1 carries the target CU-CP information in the adaptor layer header.

Determination method two: The CU-CP configures donor DU information and UE identifier information for IAB node 1, and the IAB node 1 carries donor DU identifier or address information and the UE identifier information in the adaptor layer header. The donor DU determines the target CU-CP node of the data packet according to a mapping relationship between the CU-CP identifier and the UE identifier configured (e.g., configured by the CU or the CU-CP).

Step five: The donor DU sends the control plane data packet received from the DRB to the CU or the CU-CP via an F1-C interface. Alternatively, the F1AP message sent by the donor DU to the CU-CP includes the UE identifier and the SRB ID. The UE identifier may be an F1AP ID, such as an F1AP ID obtained from the adaptor layer header of the received data packet.

Alternatively, the donor DU determines the F1AP ID corresponding to the identifier of the UE to which the data packet belongs according to the mapping relationship between the F1AP ID and the UE identifier configured (e.g., configured by the CU or the CU-CP). The donor DU then includes the F1AP ID determined through the mapping relationship and the SRB ID obtained from the adaptor layer header into the F1AP message sent to the CU-CP.

Alternatively, the donor DU determines the F1AP ID corresponding to the UE identifier and bearer of the data packet according to a mapping relationship between the F1AP ID and a combination of the SRB ID and the UE identifier configured (e.g., configured by the CU or the CU-CP). The donor DU then includes the F1AP ID determined through the mapping relationship into the F1AP message sent to the CU-CP.

Step six: After receiving the data from the donor DU, the CU-CP determines the UE and SRB corresponding to the data packet according to the information (e.g., the F1AP ID and/or the SRB ID) in an F1 message, and then performs delivery to a corresponding packet data converge protocol (PDCP) entity for subsequent processing.

Example One in Specific Embodiment One

IAB node 1 maps an uplink user plane data packet of the UE to an RLC channel or radio bearer of IAB node 1 and thus sends the data packet to IAB node 2. Specifically, IAB node 1 may map the user plane data packet of the UE to the RLC channel or radio bearer of IAB node 1 based on the methods described below (it is to be noted that these methods are also applicable to other intermediate IAB nodes, such as IAB node 2 in FIG. 5).

Method One: IAB Node 1 Maps the Data Packet of the UE to a Corresponding Bearer or RLC Channel According to a Particular Mapping Rule.

Specifically, IAB node 1 obtains the bearer, or a QCI, 5QI or QFI value of the QoS flow or the bearer identifier of the received UE data packet. The corresponding mapping is then made according to the mapping relationship information configured (e.g., configured by the CU for IAB node 1 through F1 signaling, or in the case of non-separation of the CU and the DU and IAB node 1 being gNB, configured by the IAB donor for IAB node 1 via an Xn interface or X2 interface). The mapping relationship information includes at least one of:

a mapping relationship between a QCI and a DSCP;
a mapping relationship between a 5QI and a DSCP;
a mapping relationship between a QFI and a DSCP;
a mapping relationship between a DSCP and a bearer;
a mapping relationship between a 5QI and a TOS;
a mapping relationship between a QCI and a TOS;
a mapping relationship between a 5QI and a QCI;
a mapping relationship between QCIs;
a mapping relationship between 5QIs;
a mapping relationship between QFIs; or
a mapping relationship between a bearer identifier and a QFI.

IAB node 1 obtains one or more corresponding QoS flows according to the bearer of the UE data packet. Then, IAB node 1 obtains one or more QCI, 5QI or QFI values corresponding to the one or more QoS flows. IAB node 1 obtains one or more corresponding DSCP or type of service (TOS) values according to the one or more QCI, 5QI or QFI values and mapping relationship information. IAB node 1 maps a to-be-forwarded data packet to the corresponding radio bearer, RLC channel or QoS flow of IAB node 1 according to the DSCP or TOS value (s) and the configured packet mapping rule (such as a QoS rule, a packet filter set, or a TFT). Alternatively, if IAB node 1 maps the UE data packet to the corresponding QoS flow according to the DSCP or TOS value (s) and the configured packet mapping rule, IAB node 1 maps the QoS flow to a radio bearer or an RLC channel according to the mapping relationship, and sends the UE data packet to IAB node 2 through the corresponding radio bearer or RLC channel.

Method Two

IAB node 1 obtains one or more corresponding QoS flows according to the bearer of the UE data packet. Then, IAB node 1 obtains one or more QCI, 5QI or QFI values corresponding to the one or more QoS flows, and then maps the data packet to the RLC channel or the bearer or the QoS flow corresponding to the QCI or 5QI or QFI value (s) in the configured QoS rules or the TFT. If the UE data packet is mapped to the corresponding QoS flow, IAB node 1 maps the QoS flow to the radio bearer or RLC channel according to the mapping relationship, and sends the UE data packet to IAB node 2 through the corresponding radio bearer or RLC channel.

The above is the uplink data forwarding process of specific embodiment one, and a downlink data forwarding process using the method of specific embodiment one is described below. It is to be noted that the steps described below may be used in any combination.

Step one: The donor CU-CP encapsulates an RRC message data packet of the UE in an F1AP message and sends the RRC message data packet to the donor DU via the F1-C interface. Alternatively, the F1AP message includes at least one of: target node information; a UE identifier of the data packet; a bearer identifier of the data packet; a channel identifier of the data packet; routing path information; QoS-related information; GTP tunnel information; F1AP ID information; control plane indication information; user plane indication information; or protocol type indication information. Alternatively, the target address included by the CU-CP in an IP layer is the IP address of IAB node 1.

The target node information includes, but is not limited to, a target node identifier such as an IAB node identifier, a DU identifier, a base station identifier, a cell identifier and a target index number; or the IP address of the target node; or the IP address index information of the target node.

The UE identifier information of the data packet is the UE identifier of the UE to which the data packet belongs or the UE identifier of the IAB node to which the data packet belongs; further, the UE identifier includes, but is not limited to, an F1AP ID, a C-RNTI, an S1 AP ID, an X2 AP ID, an NG AP ID, an Xn AP ID, and a newly defined identifier.

The bearer/channel identifier information of the data packet is the identifier of the bearer/channel of the UE to which the data packet belongs, or the identifier of the bearer/channel of the IAB node to which the data packet belongs. The bearer identifier is one of: a DRB ID, an SRB ID, an LCID, a QFI, or a flow identifier.

The routing path information includes, but is not limited to, a routing path identifier, a routing path number, and a routing path index number.

The QoS-related information includes, but is not limited to, a QCI, 5QI, QFI, or DSCP value.

The GTP tunnel information includes a TNL address and/or GTP TEID information.

The protocol type indication information includes, but is not limited to, an RRC message, an NAS message, an F1AP message, and OAM information.

Step two: The donor DU parses the received F1AP message and then performs adaptor layer encapsulation. The adaptor layer header includes at least one of: target node information, a UE identifier of a data packet, a bearer identifier of a data packet, a channel identifier of a data packet, routing path information, QoS-related information, GTP tunnel information, F1AP ID information, control plane indication information, user plane indication information, or protocol type indication information.

The donor DU may determine target node information by using methods described below.

Determination method one: The donor DU determines the target IAB node of the data packet according to the mapping relationship between target node information and a UE identifier configured (e.g., configured by the CU or the CU-CP), where the target node information may be information such as a base station identifier, a DU identifier, an IP address, and an IP address index.

Determination method two: The donor DU obtains target IP address information from the IP layer of the received data packet.

Determination method three: The donor DU obtains target IP address information from the IP layer of the received data packet, and then determines the target node information according to the configured mapping relationship between an IP address and target node information.

Alternatively, the donor DU determines the UE identifier of the UE to which the data packet belongs according to the mapping relationship between an F1AP ID and a UE identifier configured (e.g., configured by the CU or the CU-CP). Alternatively, the donor DU determines the UE identifier and bearer identifier of the data packet according to a mapping relationship between an F1AP ID and a combination of an SRB ID and a UE identifier configured (e.g., configured by the CU or the CU-CP).

Step three: The donor DU sends, through a DRB or a user plane RLC channel, a control plane data packet received from the CU-CP to IAB node 2.

Step four: IAB node 2 sends the received data packet to the next-hop node, i.e., IAB node 1, according to information in an adaptor layer header.

Step five: IAB node 1 determines the UE and bearer to which the data packet belongs according to the information in the adaptor layer header, and sends the data packet to a corresponding UE through an SRB.

Example Two in Specific Embodiment One

IAB node 1 maps an uplink user plane data packet of the UE to an RLC channel or radio bearer of IAB node 1 and thus sends the data packet to IAB node 2.

After receiving the data packet from the donor CU (or donor CU-UP), the IAB donor DU determines that the next-hop node is IAB node 2. Alternatively, the IAB donor DU maps the data packet to the QoS flow of IAB node 2 corresponding to the QCI, 5QI or QFI value according to the DSCP or TOS information in the IP header of the received data packet and the configured mapping information (e.g., configured by the CU for the IAB donor DU through F1 signaling, or in the case of non-separation of the CU and the DU and IAB donor DU being replaced by a base station, configured by the CU for the base station via an Xn interface or X2 interface), the QoS flow is then mapped to a corresponding bearer or RLC channel according to the mapping information, and the data packet is sent to IAB node 2 through the bearer or RLC channel. Specifically, the mapping information includes one of:

a mapping relationship between a QCI and a DSCP;
a mapping relationship between a DSCP and a 5QI;
a mapping relationship between a DSCP and a QFI;
a mapping relationship between a DSCP and a bearer;
a mapping relationship between a 5QI and a TOS;
a mapping relationship between a QCI and a TOS;
a mapping relationship between a 5QI and a QCI;
a mapping relationship between QCIs;
a mapping relationship between 5QIs;
a mapping relationship between QFIs; or
a mapping relationship between a bearer identifier and a QFI.

Alternatively, IAB node 2 obtains one or more corresponding QoS flows according to the bearer of the received data packet. Then, IAB node 2 obtains one or more QCI, 5QI or QFI values corresponding to the one or more QoS flows or determines the QoS information (QCI, 5QI or QFI value) according to the adaptor layer header information of the received data packet. The data packet is then mapped to a bearer/the QoS flow of IAB node 1 corresponding to the QCI, 5QI or QFI value and sent to IAB node 1. If the data packet is mapped to the corresponding QoS flow, IAB node 2 maps the QoS flow to the radio bearer or RLC channel according to the mapping relationship, and sends the UE data packet to IAB node 1 through the corresponding radio bearer or RLC channel.

Specific Embodiment Two: Method Two for Sending an NAS/RRC Message Through a UP

Figure 6:
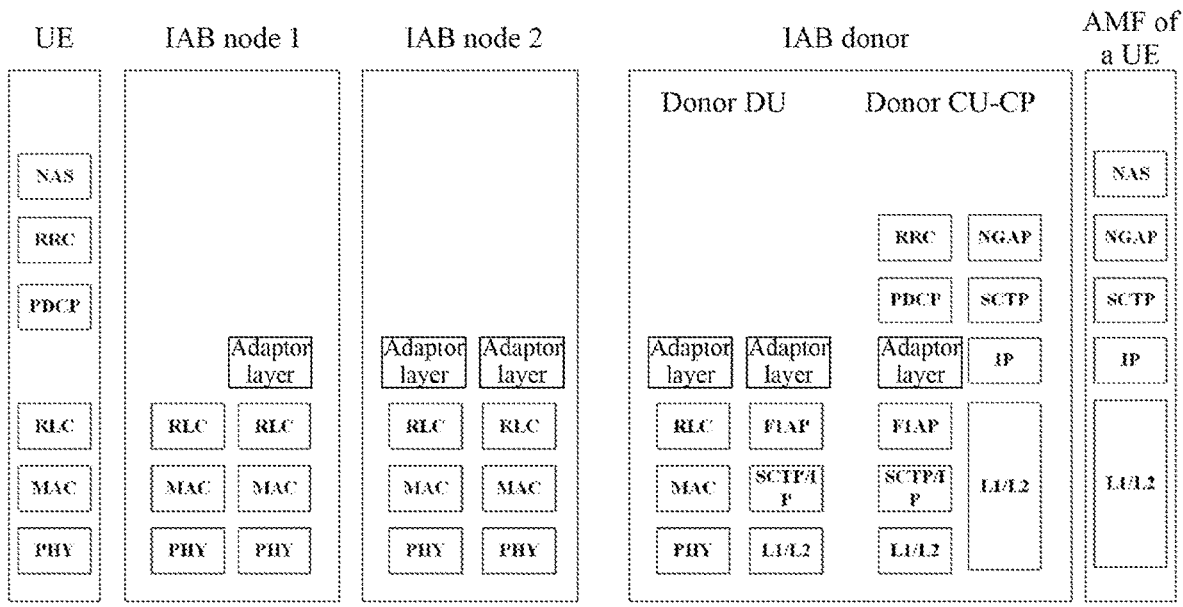
FIG. 6 is a schematic diagram illustrating a protocol stack between a UE and an AMF according to specific embodiment two.

The method in this specific embodiment is method two for forwarding the NAS/RRC message through the user plane. FIG. 6 is a schematic diagram illustrating a protocol stack between a UE and an AMF according to specific embodiment two, as shown in FIG. 6. In FIG. 6, adaptor layers are located above RLC layers of IAB nodes and above an RLC layer of an IAB donor DU. It is to be noted that the adaptor layer/adaptation layer may also be located between an RLC layer and a MAC layer, or an adaptor layer function is located in the RLC layer or the MAC layer. In addition, the donor CU-CP in FIG. 6 may also be a donor CU, and then the donor CU-CP in this specific embodiment is replaced by the donor CU.

For the forwarding of an uplink data packet, the method of specific embodiment two differs from the method of specific embodiment one in that the F1AP message sent by the donor DU to the CU-CP may not include the UE identifier and the SRB ID. The adaptor layer header and/or F1AP protocol header of the data packet sent by the donor DU to the CU-CP include at least one of: a UE identifier of the data packet, a bearer identifier of the data packet, or a channel identifier of the data packet.

For the forwarding of a downlink data packet, the method of specific embodiment two differs from the method of specific embodiment one in that the CU-CP performs adaptor layer processing on the received uplink data packet and then performs F1AP processing. The adaptor layer header and/or F1AP protocol header of the downlink data packet sent by the CU-CP to the donor DU include at least one of: target node information; a UE identifier of the data packet; a bearer identifier of the data packet; a channel identifier of the data packet; routing path information; QoS-related information; GTP tunnel information; F1AP ID information; control plane indication information; user plane indication information; or protocol type indication information.

Figure 7:
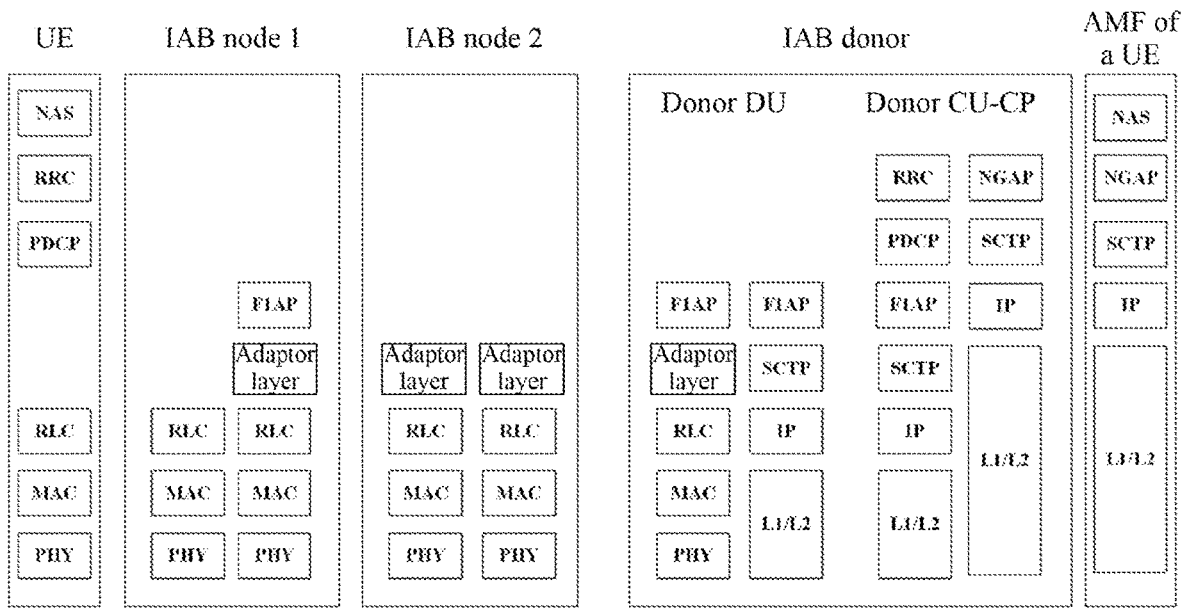
FIG. 7 is a schematic diagram illustrating a protocol stack between a UE and an AMF according to specific embodiment three.

Specific Embodiment Three: Method Three for Sending an NAS/RRC Message Through a UP The method in this specific embodiment is method three for forwarding the NAS/RRC message through the user plane. FIG. 7 is a schematic diagram illustrating a protocol stack between a UE and an AMF according to specific embodiment three, as shown in FIG. 7. In FIG. 7, adaptor layers are located above RLC layers of IAB nodes and above an RLC layer of an IAB donor DU. It is to be noted that the adaptor layer/adaptation layer may also be located between an RLC layer and a MAC layer, or an adaptor layer function is located in the RLC layer or the MAC layer. In addition, the donor CU-CP in FIG. 7 may also be a donor CU, and then the donor CU-CP in this specific embodiment is replaced by the donor CU. In addition, an adaptor layer may also exist over the interface between the donor DU and the CU-CP, that is, the donor DU and the CU-CP perform adaptor layer processing and encapsulation.

In the method of this specific embodiment, a stream control transmission protocol (SCTP)/Internet Protocol (IP) layer is replaced by an adaptor layer. It is to be noted that the SCTP/IP layer may exist between an F1AP protocol layer and the adaptor layer. In addition, it is possible that no F1AP layer exists on the donor DU, that is, the donor DU does not perform F1AP protocol layer processing.

For uplink, IAB node 1 performs F1AP encapsulation before performing adaptor layer encapsulation. Alternatively, the F1AP message may include UE identifier and/or bearer identifier information.

The donor DU needs to be able to determine the target node (i.e., CU-CP) of the data packet, and may use the methods described below.

Determination method one: The CU-CP configures a target CU-CP identifier or address for IAB node 1, and IAB node 1 carries the target CU-CP identifier or address information in an adaptor layer.

Determination method two: The CU-CP configures a donor DU identifier or address and UE identifier information (such as an F1AP ID) for IAB node 1, and IAB node 1 carries the donor DU identifier or address information in an adaptor layer. The donor DU may parse an F1AP message to obtain the F1AP ID therein. The donor DU then determines the target CU-CP node of the data packet according to a mapping relationship between the CU-CP identifier and the UE identifier information configured (e.g., configured by the CU-CP).

After receiving data from the donor DU, the CU-CP may identify the UE and SRB corresponding to the data packet according to the F1AP ID and SRB ID included in the F1AP message. Methods described below may be used.

Identification method one: The F1AP message sent by the donor DU to the CU-CP includes the F1AP ID and SRB ID obtained after the donor DU performs F1AP parsing on the received data packet.

Identification method two: The donor DU does not perform F1AP parsing processing or F1AP encapsulation processing on the data packet received from IAB node 2, that is, no F1AP protocol layer exists on the donor DU in FIG. 3.

Identification method three: The CU-CP configures the mapping relationship (e.g., in the uplink and/or the downlink) between F1AP IDs for the donor DU. The donor DU obtains the F1AP ID and the SRB ID after performing F1AP parsing on the received data packet, and then determines the corresponding F1AP ID according to the mapping relationship between F1AP IDs. The donor DU then includes the SRB ID and the corresponding F1AP ID which is determined according to the mapping relationship into the F1AP message sent to the CU-CP.

A downlink data forwarding process using the method of this specific embodiment is described below. It is to be noted that steps described below may be used in any combination.

Step one: The donor CU-CP encapsulates an RRC message data packet of the UE in an F1AP message and sends the RRC message data packet to the donor DU via the F1-C interface. Alternatively, the F1AP message includes at least one of: target node information; a UE identifier of the data packet; a bearer identifier of the data packet; a channel identifier of the data packet; routing path information; QoS-related information; GTP tunnel information; F1AP ID information; control plane indication information; user plane indication information; or protocol type indication information. Alternatively, the target address included by the CU-CP in an IP layer is the IP address of IAB node 1.

Step two: The donor DU parses the received F1AP message and then performs adaptor layer encapsulation. The adaptor layer header includes at least one of: target node information, routing path information, QoS-related information, GTP tunnel information, control plane indication information, user plane indication information, or protocol type indication information.

The donor DU may determine target node information by using methods described below.

Determination method one: The donor DU determines the target IAB node of the data packet according to the mapping relationship between target node information and a UE identifier configured (e.g., configured by the CU or the CU-CP), where the target node information may be information such as a base station identifier, a DU identifier, an IP address, and an IP address index.

Determination method two: The donor DU obtains the target node information from the F1AP message of the received data packet.

Determination method three: The donor DU obtains target IP address information from the IP layer of the received data packet, and then determines target identifier information according to the configured mapping relationship between an IP address and target node information.

alternatively, the donor DU determines the UE identifier of the UE to which the data packet belongs according to the mapping relationship between an F1AP ID and a UE identifier configured (e.g., configured by the CU or the CU-CP). Alternatively, the donor DU determines the UE identifier and bearer identifier of the data packet according to a mapping relationship between an F1AP ID and a combination of an SRB ID and a UE identifier configured (e.g., configured by the CU or the CU-CP).

Step three: The donor DU sends, through a DRB or a user plane RLC channel, a control plane data packet received from the CU-CP to IAB node 2.

Step four: IAB node 2 sends the received data packet to the next-hop node, i.e., IAB node 1, according to information in an adaptor layer header.

Step five: IAB node 1 determines the UE and bearer to which the data packet belongs according to information in the adaptor layer header and F1AP message, and sends the data packet to the corresponding UE through an SRB.

Specific Embodiment Four: Sending an NAS/RRC Message Through a UP, a CU-UP

Figure 8A:
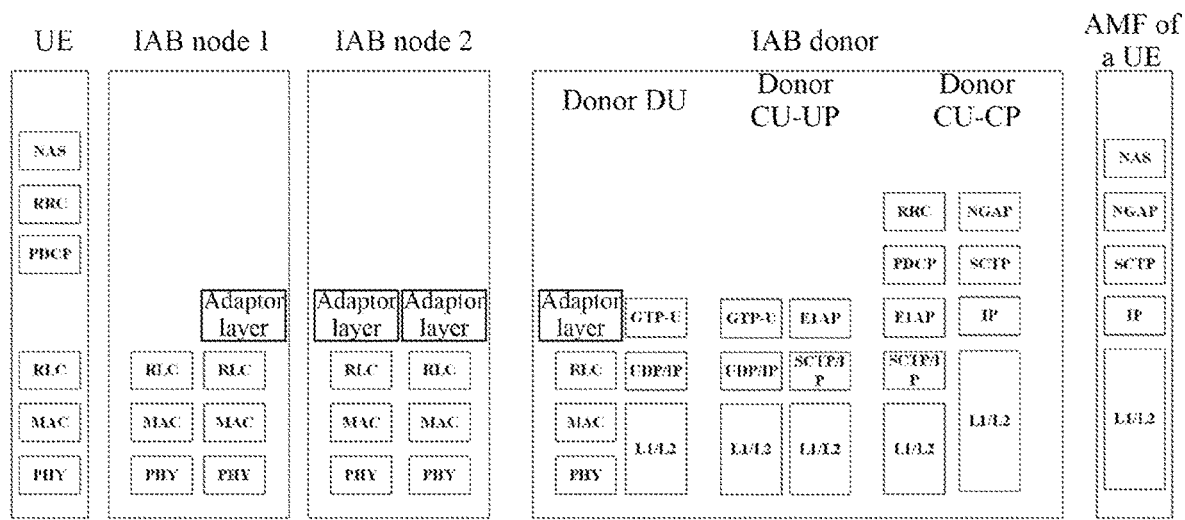
FIG. 8A is schematic diagram one illustrating a protocol stack between a UE and an AMF according to specific embodiment four.
Figure 8B:
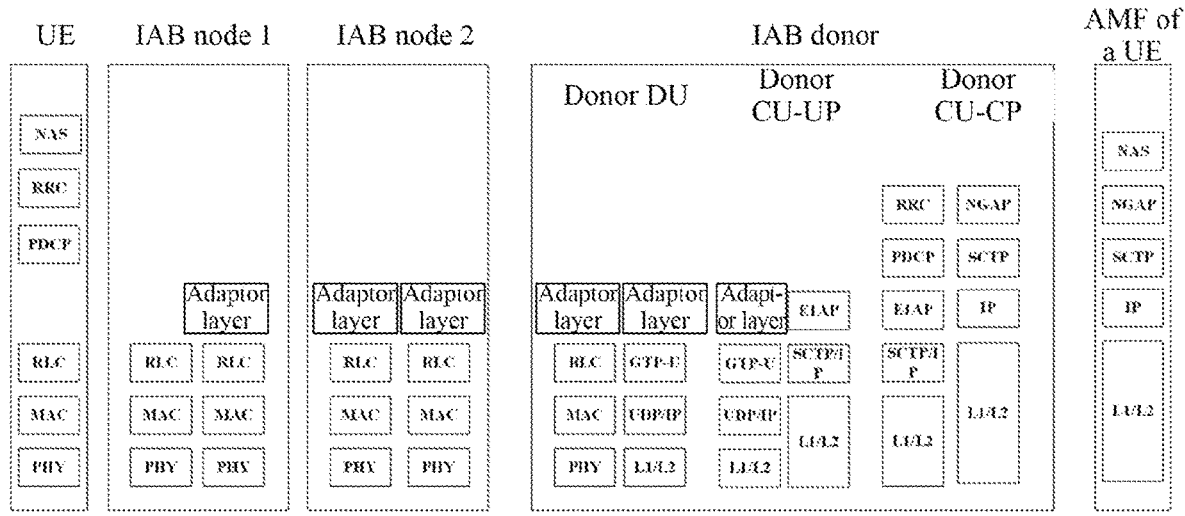
FIG. 8B is a schematic diagram illustrating a protocol stack in which an adaptor layer presents on a CU-UP according to specific embodiment four.
Figure 8C:
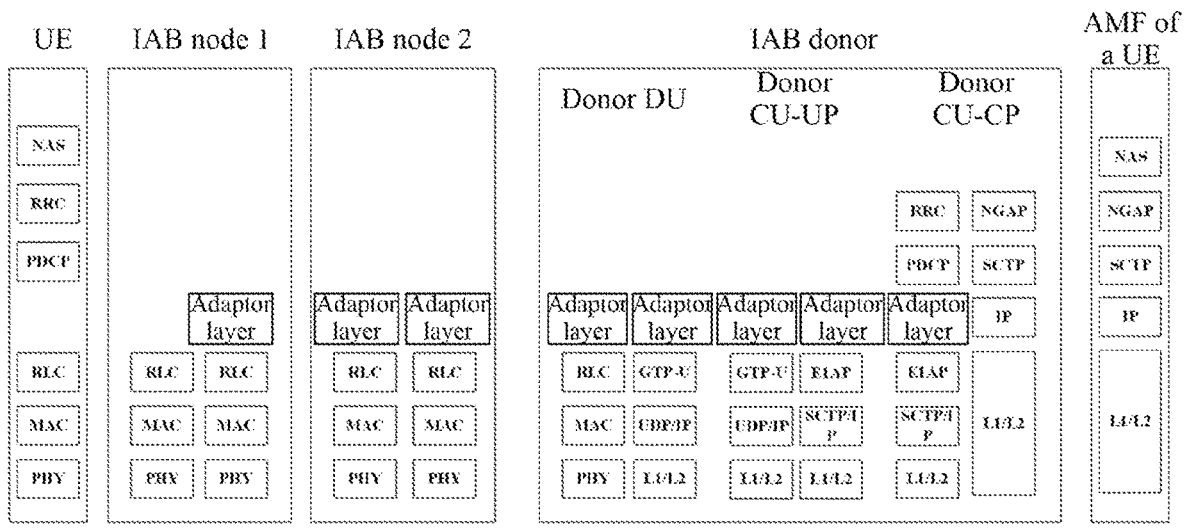
FIG. 8C is a schematic diagram illustrating a protocol stack in which adaptor layers present on a CU-UP and a CU-CP according to specific embodiment four.

The method in specific embodiment four is method four for forwarding the NAS/RRC message through the user plane. FIG. 8A is schematic diagram one illustrating a protocol stack between a UE and an AMF according to specific embodiment four. FIG. 8B is a schematic diagram illustrating a protocol stack in which an adaptor layer exists on a CU-UP according to specific embodiment four. FIG. 8C is a schematic diagram illustrating a protocol stack in which adaptor layers exist on a CU-UP and a CU-CP according to specific embodiment four. As shown in FIGS. 8A to 8C, the NAS/RRC message of the UE is forwarded by IAB nodes to the CU-UP, and then sent by the CU-UP to the CU-CP. Adaptor layers are located above RLC layers of IAB nodes and above an RLC layer of an IAB donor DU. It is to be noted that the adaptor layer/adaptation layer may also be located between an RLC layer and a MAC layer, or an adaptor layer function is located in the RLC layer or the MAC layer.

In the method of the specific embodiment in FIG. 8A, for uplink data forwarding, steps one to three are the same as those in specific embodiment one, and reference can be made to the previous specific embodiment one. The subsequent steps are described below.

Step four: The donor DU receives the data packet and sends the data packet to the CU-UP via an F1-U interface.

Alternatively, the donor DU may indicate that the forwarded data packet is a control plane data packet by using methods described below.

Option one: The donor DU sends the control plane data packet to the CU-UP through a GTP-U tunnel dedicated to forwarding signaling.

Option two: The F1 GTP-U header sent by the donor DU to the CU-UP carries one of an SRB ID or a CP indication.

Alternatively, the donor DU may indicate the target node information of the forwarded data packet by using methods described below.

1) The adaptor layer header of the data packet received by the donor DU includes CU-CP node information, and the GTP-U header sent by the donor DU to the CU-UP carries CU-CP node information.

2) The CU-CP configures the mapping relationship between the F1 GTP-U tunnel and CU-CP node information for the donor DU and the CU-UP, the adaptor layer header of the data packet received by the donor DU includes the CU-CP node information, and the donor DU determines, according to the above mapping relationship and the CU-CP node information, the F1 GTP-U tunnel used for forwarding the data packet.

Alternatively, the donor DU may indicate UE identifier and SRB ID information of the forwarded data packet by using methods described below.

Indication method one: The F1 GTP-U header sent by the donor DU to the CU-UP carries a UE identifier and/or an SRB ID.

Indication method two: The CU-CP configures the mapping relationship between an SRB of a UE and an F1 GTP-U tunnel for the donor DU and the CU-UP. The donor DU determines, according to the above mapping relationship, the F1 GTP-U tunnel used for forwarding the data packet.

Step five: The E1AP message sent by the CU-UP to the CU-CP includes the UE identifier and the SRB ID. Alternatively, the UE identifier may be an E1AP ID.

A downlink data forwarding process using the method of specific embodiment four in FIG. 8A is described below. It is to be noted that steps described below may be used in any combination.

Step one: The donor CU-CP encapsulates an RRC message data packet of the UE in an E1AP message and sends the RRC message data packet to the CU-UP via an E1 interface. Alternatively, the E1AP message includes at least one of: target node information; a UE identifier of the data packet; a bearer identifier of the data packet; a channel identifier of the data packet; routing path information; QoS-related information; GTP tunnel information; F1AP ID information; control plane indication information; user plane indication information; or protocol type indication information. Alternatively, the target address included by the CU-CP in an IP layer is the IP address of IAB node 1.

Step two: The CU-UP sends the received data packet to the donor DU through the F1 GTP-U tunnel.

Alternatively, the CU-UP may indicate that the forwarded data packet is a control plane data packet by using methods described below.

Indication method one: The CU-UP sends the control plane data packet to the donor DU through a GTP-U tunnel dedicated to forwarding signaling.

Indication method two: The F1 GTP-U header sent by the CU-UP to the donor DU carries one of an SRB ID or a CP indication.

The CU-UP may determine target node information by using methods described below.

Determination method one: The CU-UP determines the target IAB node of the data packet according to the mapping relationship between target node information and a UE identifier configured (e.g., configured by the CU), where the target node information may be information such as a base station identifier, a DU identifier, an IP address, and an IP address index.

Determination method two: The CU-UP can obtain the target node information according to the E1AP message of the received data packet.

Determination method three: The CU-UP can determine target identifier information according to target IP address information included in the IP layer of the received data packet and the configured mapping relationship between an IP address and target node information.

The CU-UP may indicate the target node information of the forwarded data packet by using methods described below.

Indication method one: The GTP-U header sent by the CU-UP to the donor DU carries the target node information.

Indication method two: The CU-CP configures the mapping relationship between the F1 GTP-U tunnel and CU-CP node information for the donor DU and the CU-UP, the adaptor layer header of the data packet received by the donor DU includes the CU-CP node information, and the donor DU determines, according to the above mapping relationship and the CU-CP node information, the F1 GTP-U tunnel used for forwarding the data packet.

Alternatively, the CU-UP may indicate UE identifier and SRB ID information of the forwarded data packet by using methods described below.

Indication method one: The F1 GTP-U header sent by the CU-UP to the donor DU carries a UE identifier and/or an SRB ID.

Indication method two: The CU-CP configures the mapping relationship between an SRB of a UE and an F1 GTP-U tunnel for the donor DU and the CU-UP. The CU-UP determines, according to the above mapping relationship, the F1 GTP-U tunnel used for forwarding the data packet.

Step three: The donor DU parses the received GTP-U data packet and then performs adaptor layer encapsulation. The adaptor layer header includes at least one of: target node information, a UE identifier of the data packet, a bearer identifier of the data packet, a channel identifier of the data packet, routing path information, QoS-related information, GTP tunnel information, HAP ID information, control plane indication information, user plane indication information, or protocol type indication information.

The donor DU may determine target node information by using methods described below.

Determination method one: The donor DU determines the target IAB node of the data packet according to the mapping relationship between target node information and a UE identifier configured (e.g., configured by the CU or the CU-CP), where the target node information may be information such as a base station identifier, a DU identifier, an IP address, and an IP address index.

Determination method two: The donor DU obtains the target node information from the GTP-U header of the received data packet.

Determination method three: The donor DU obtains target IP address information from the IP layer of the received data packet, and then determines the target node information according to the configured mapping relationship between an IP address and target node information.

Step four: The donor DU sends, through a DRB or a user plane RLC channel, a control plane data packet received from the CU-UP to IAB node 2.

Step five: IAB node 2 sends the received data packet to the next-hop node, i.e., IAB node 1, according to information in an adaptor layer header.

Step six: IAB node 1 determines the UE and bearer to which the data packet belongs according to the information in the adaptor layer header, and sends the data packet to the corresponding UE through an SRB.

In addition, adaptor layers may also exist on the CU-UP and/or the CU-CP, that is, the CU-UP and/or the CU-CP perform adaptor layer processing and encapsulation. FIG. 8B is a schematic diagram illustrating a protocol stack in which an adaptor layer exists on a CU-UP. FIG. 8C is a schematic diagram illustrating a protocol stack in which adaptor layers exist on a CU-UP and a CU-CP.

Figure 9:
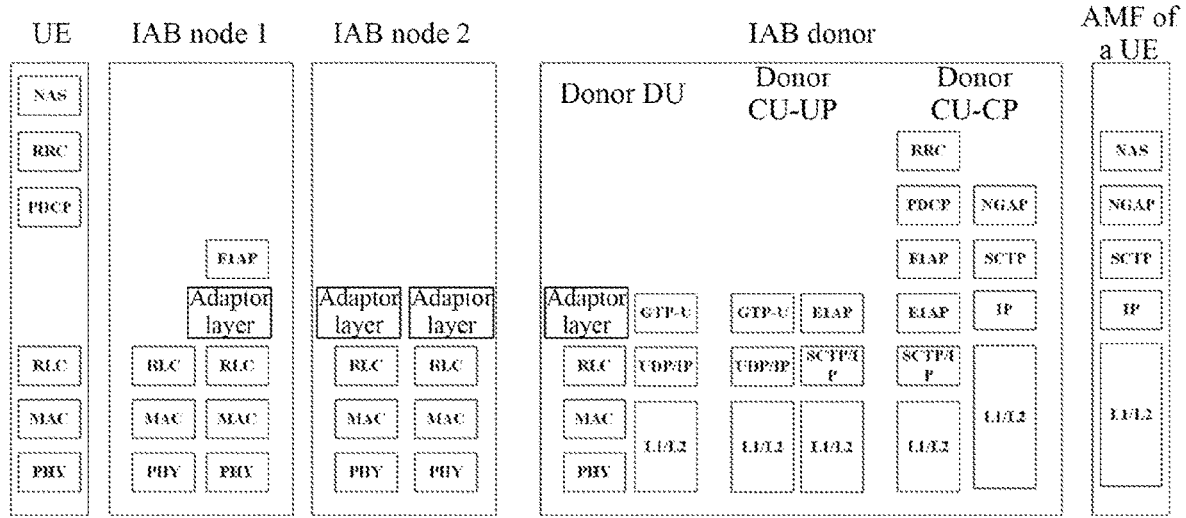
FIG. 9 is a schematic diagram illustrating a protocol stack between a UE and an AMF according to specific embodiment five of the present application.

Specific Embodiment Five: Sending an NAS/RRC Message Through a UP, a CU-UP, with an F1 AP Protocol Layer Retained The method in specific embodiment five is method five for forwarding the NAS/RRC message through the user plane. FIG. 9 is a schematic diagram illustrating a protocol stack between a UE and an AMF according to specific embodiment five of the present application. As shown in FIG. 9, adaptor layers are located above RLC layers of IAB nodes and above an RLC layer of an IAB donor DU. It is to be noted that the adaptor layer/adaptation layer may also be located between an RLC layer and a MAC layer, or an adaptor layer function is located in the RLC layer or the MAC layer. In the method of this specific embodiment, the SCTP/IP layer is replaced by an adaptor layer. It is to be noted that the SCTP/IP layer may exist between an F1AP protocol layer and the adaptor layer.

In specific embodiment five, what differs from specific embodiment four is that for the uplink, IAB node 1 performs F1AP encapsulation before performing adaptor layer encapsulation. Alternatively, the F1AP message may include UE identifier and/or bearer identifier information. For the downlink, the CU-CP first performs F1AP encapsulation on the RRC message, where the F1AP message may include UE identifier and/or bearer identifier information, and then the CU-CP performs E1AP encapsulation and sends the message to the CU-UP.

Specific Embodiment Six: Routing an F1AP Message Through a UP

Figure 10:
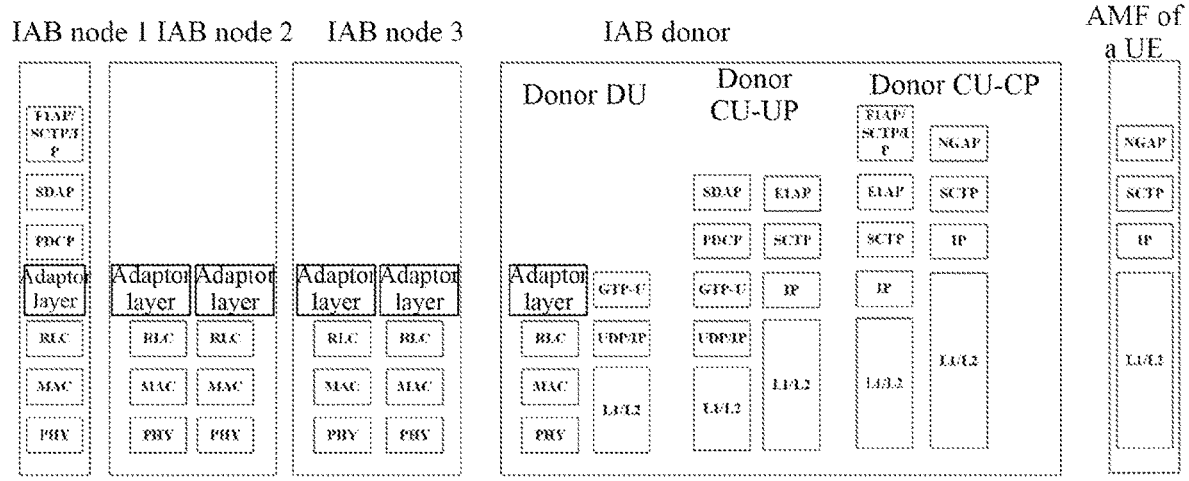
FIG. 10 is a schematic diagram illustrating a protocol stack between IAB node 1 and an AMF according to specific embodiment six of the present application.

The method in specific embodiment six is a method for forwarding the F1AP message through the user plane. FIG. 10 is a schematic diagram illustrating a protocol stack between IAB node 1 and an AMF according to specific embodiment six of the present application. As shown in FIG. 10, adaptor layers are located above RLC layers of IAB nodes and above an RLC layer of an IAB donor DU. It is to be noted that the adaptor layer/adaptation layer may also be located between an RLC layer and a MAC layer, or an adaptor layer function is located in the RLC layer or the MAC layer. In FIG. 6, an SCTP/IP protocol layer exists below an F1AP protocol layer. Alternatively, the SCTP/IP protocol layer may be deleted. In addition, adaptor layers may also exist on the CU-UP and/or the CU-CP, that is, the CU-UP and/or the CU-CP perform adaptor layer processing and encapsulation.

An uplink data forwarding process using the method of this specific embodiment is described below. It is to be noted that steps described below may be used in any combination.

Step one: The F1AP message generated by IAB node 1 is sent through the DRB of IAB node 1. IAB node 1 performs adaptor layer encapsulation. The adaptor layer header includes at least one of: target node information; a UE identifier (of the MT part of IAB node 1) of a data packet; a bearer identifier of a data packet; a channel identifier of a data packet; routing path information; QoS-related information; GTP tunnel information; F1AP ID information; control plane indication information; user plane indication information; or protocol type indication information.

Alternatively, the UE identifier of the MT part of IAB node 1 included in the adaptor layer header may be allocated by using methods described below.

Allocation method one: The UE ID included in the adapt is allocated by the CU-CP. The CU-CP sends the UE ID to the MT part (e.g., MAC layer control information and an RRC message) of IAB node 1, and alternatively, the CU-CP sends a mapping relationship between an E1 AP ID and a UE ID to the CU-UP (e.g., through E1 signaling).

Allocation method two: The UE ID included in the adapt is allocated by the CU-UP. After allocating the UE ID to the MT part of IAB node 1, the CU-UP sends the UE ID to the CU-CP (e.g., through E1 signaling), and the CU-CP sends the UE ID to the MT part (e.g., MAC layer control information and RRC message) of IAB node 1.

Allocation method three: If the UE ID included in the adapt is allocated by a higher-level IAB node (IAB node 2), IAB node 2 sends the UE ID to the CU-CP (e.g., through F1 signaling), and the CU-CP sends the UE ID to the CU-UP (e.g., through E1 signaling).

Step two: The data packet sent by IAB node 1 is forwarded by IAB node 2 and IAB node 3 to the donor DU. The donor DU receives the data packet through the user plane and then sends the data packet to the CU-UP via an F1-U interface. After receiving the data packet from IAB node 3, the donor DU distinguishes between a control plane data packet and a user plane data packet by using the methods described below.

Distinguishing method one: If the donor DU receives the data packet from the DRB dedicated to forwarding control plane signaling, the data packet is a control plane signaling data packet.

Distinguishing method two: If the adaptor layer header includes control plane indication information, the data packet is a control plane signaling data packet.

Alternatively, the donor DU may indicate that the forwarded data packet is a control plane data packet by using methods described below.

Indication method one: The donor DU sends the control plane data packet to the CU-UP through a GTP-U tunnel dedicated to forwarding signaling.

Indication method two: The F1 GTP-U header sent by the donor DU to the CU-UP carries CP indication information.

Alternatively, the donor DU may indicate the target node information of the forwarded data packet by using methods described below.

Indication method one: The adaptor layer header of the data packet received by the donor DU includes UE identifier (i.e., of the MT part of IAB node 1) information, the CU-CP configures a mapping relationship between a UE identifier and a CU-CP node for the donor DU, the donor DU determines the target CU-CP node information according to the mapping relationship, and the GTP-U header sent by the donor DU to the CU-UP carries CU-CP node information.

Indication method two: The adaptor layer header of the data packet received by the donor DU includes CU-CP node information, and the GTP-U header sent by the donor DU to the CU-UP carries the CU-CP node information.

Indication method three: The CU-CP configures the mapping relationship between an F1 GTP-U tunnel and CU-CP node information for the donor DU and the CU-UP, the adaptor layer header of the data packet received by the donor DU includes the CU-CP node information or the CU-CP node information is obtained by using method one; and the donor DU determines, according to the above mapping relationship and the CU-CP node information, the F1 GTP-U tunnel used for forwarding the data packet.

Alternatively, the donor DU may indicate UE identifier (i.e., of the MT part of IAB node 1) and DRB ID information of the forwarded data packet by using methods described below.

Indication method one: The F1 GTP-U header sent by the donor DU to the CU-UP carries a UE identifier and/or an DRB ID.

Indication method two: The CU-CP configures the mapping relationship between a DRB of a UE (i.e., of the MT part of IAB node 1) and an F1 GTP-U tunnel for the donor DU and the CU-UP.

The donor DU determines, according to the above mapping relationship, the F1 GTP-U tunnel used for forwarding the data packet.

A downlink data forwarding process using the method of this specific embodiment is described below. It is to be noted that steps described below may be used in any combination.

Step one: The donor CU-CP generates an F1AP message, encapsulates the F1AP message in an E1AP message and sends the F1AP message to the CU-UP via an E1 interface. The F1AP message may include UE identifier and/or bearer identifier information. Alternatively, the E1 AP message includes at least one of: target node information; a UE identifier of the data packet; a bearer identifier of the data packet; a channel identifier of the data packet; routing path information; QoS-related information; GTP tunnel information; F1AP ID information; control plane indication information; user plane indication information; or protocol type indication information. Alternatively, the target address included by the CU-CP in an IP layer is the IP address of IAB node 1.

Step two: The CU-UP sends the received data packet to the donor DU through the F1 GTP-U tunnel.

Alternatively, the CU-UP may indicate that the forwarded data packet is a control plane data packet by using methods described below.

Indication method one: The CU-UP sends the control plane data packet to the donor DU through a GTP-U tunnel dedicated to forwarding signaling.

Indication method two: The F1 GTP-U header sent by the CU-UP to the donor DU carries a CP indication.

The CU-UP may determine target node information by using methods described below.

Determination method one: The CU-UP determines the target IAB node of the data packet according to the mapping relationship between target node information and a UE identifier configured (e.g., configured by the CU), where the target node information may be information such as a base station identifier, a DU identifier, an IP address, and an IP address index.

Determination method two: The CU-UP can obtain the target node information according to the E1AP message of the received data packet.

Determination method three: The CU-UP can determine target identifier information according to target IP address information included in the IP layer of the received data packet and alternatively according to the configured mapping relationship between an IP address and target node information.

The CU-UP may indicate the target node information of the forwarded data packet by using methods described below.

Indication method one: The GTP-U header sent by the CU-UP to the donor DU carries the target node information.

Indication method two: The CU-CP configures the mapping relationship between the F1 GTP-U tunnel and target IAB node information for the donor DU and the CU-UP. After determining the target IAB node of the data packet, the CU-UP determines, according to the above mapping relationship and the target IAB node information, the F1 GTP-U tunnel used for forwarding the data packet.

Indication method three: The IP header of the data packet sent by the CU-UP to the donor DU includes the IP address information of a target node.

Alternatively, the CU-UP may indicate UE identifier (of the MT part of IAB node 1) and DRB ID information of the forwarded data packet by using methods described below.

Indication method one: The F1 GTP-U header sent by the CU-UP to the donor DU carries a UE identifier and/or a DRB ID.

Indication method two: The CU-CP configures the mapping relationship between a DRB of a UE and an F1 GTP-U tunnel for the donor DU and the CU-UP. The CU-UP determines, according to the above mapping relationship, the F1 GTP-U tunnel used for forwarding the data packet.

Step three: The donor DU parses the received GTP-U data packet and then performs adaptor layer encapsulation. The adaptor layer header includes at least one of: target node information, a UE identifier of the data packet, a bearer identifier of the data packet, a channel identifier of the data packet, routing path information, QoS-related information, GTP tunnel information, F1AP ID information, control plane indication information, user plane indication information, or protocol type indication information.

The donor DU may determine target node information by using methods described below.

Determination method one: The donor DU determines the target IAB node of the data packet according to the mapping relationship between target node information and a UE identifier configured (e.g., configured by the CU or the CU-CP), where the target node information may be information such as a base station identifier, a DU identifier, an IP address, and an IP address index.

Determination method two: The donor DU obtains the target node information from the GTP-U header of the received data packet.

Determination method three: The donor DU obtains target IP address information from the IP layer of the received data packet, and then determines the target node information according to the configured mapping relationship between an IP address and target node information.

Step three: The donor DU determines a next-hop node and sends, through a DRB or a user plane RLC channel, a control plane data packet received from the CU-UP to IAB node 3.

Step four: IAB node 2 sends the received data packet to the next-hop node, i.e., IAB node 4, according to information in an adaptor layer header.

Step five: IAB node 1 determines the UE and bearer to which the data packet belongs according to the information in the adaptor layer header, and sends the data packet to the corresponding MT part of IAB node 1 through a DRB.

In addition, in step one of the uplink data forwarding process of the method in this specific embodiment, IAB node 1 may not perform adaptor layer processing on the F1 message generated by IAB node 1 itself, that is, no adaptor layer header is added, and IAB node 2 needs to add the adaptor layer header to the data. IAB node 1 may send an F1AP message in two manners described below.

Sending manner one: The F1AP message may be sent through a dedicated DRB (or set one used for indicating that a data packet is a control plane data packet and that the next-hop IAB node does not parse the adaptor layer but is required to encapsulate the adaptor layer). A user plane data packet generated by the MT part of IAB node 1 may be sent through a dedicated DRB (or set two used for indicating that a data packet is a user plane data packet and that the next-hop IAB node does not parse the adaptor layer but is required to encapsulate the adaptor layer). IAB node 2 then performs sending to the next-hop node through a dedicated DRB (or set three used for indicating that a data packet is a control plane data packet and that the next-hop IAB node is required to parse the adaptor layer in order to provide higher QoS for the control plane data packet).

Sending manner two: Only one dedicated DRB (or set) is defined to distinguish whether the next-hop IAB node is required to parse the adaptor layer. That is, for the F1 message generated by IAB node 1 and the user plane data packet generated by the MT part of IAB node 1, the IAB node 1 does not add an adaptor layer header and sending may be performed through a dedicated DRB (or set used for indicating that the next-hop IAB node does not parse the adaptor layer but is required to encapsulate the adaptor layer). IAB node 2 performs sending to the next-hop node through the DRB.

Figure 11:
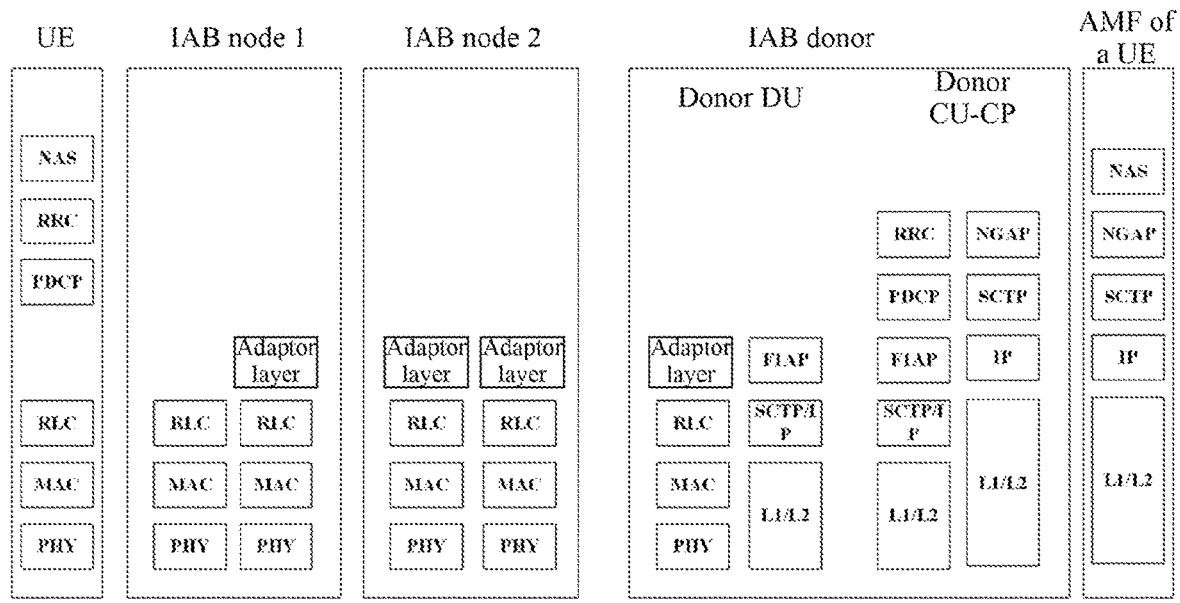
FIG. 11 is a schematic diagram illustrating a protocol stack between a UE and an AMF according to specific embodiment seven of the present application.

Specific Embodiment Seven: Method One for Sending an NAS/RRC Message Through a CP The method in specific embodiment seven is method one for forwarding the NAS/RRC message through the control plane. FIG. 11 is a schematic diagram illustrating a protocol stack between a UE and an AMF according to specific embodiment seven of the present application. As shown in FIG. 11, adaptor layers are located above RLC layers of IAB nodes and above an RLC layer of an IAB donor DU. It is to be noted that the adaptor layer/adaptation layer may also be located between an RLC layer and a MAC layer, or an adaptor layer function is located in the RLC layer or the MAC layer. In addition, the donor CU-CP in FIG. 11 may also be a donor CU, and then the donor CU-CP in this specific embodiment is replaced by the donor CU. The specific embodiment seven differs from specific embodiment one in that the IAB node/donor DU forwards a control plane data packet to the next-hop node through an SRB. The donor DU can determine whether the received uplink data packet is a control plane data packet or a user plane data packet according to a bearing type (i.e., an SRB or a DRB), that is, the donor DU can determine that the received uplink data packet is a control plane data packet after receiving the uplink data packet through the SRB. Other uplink and downlink data forwarding steps in the method of this specific embodiment are similar to those of specific embodiment one.

Figure 12:
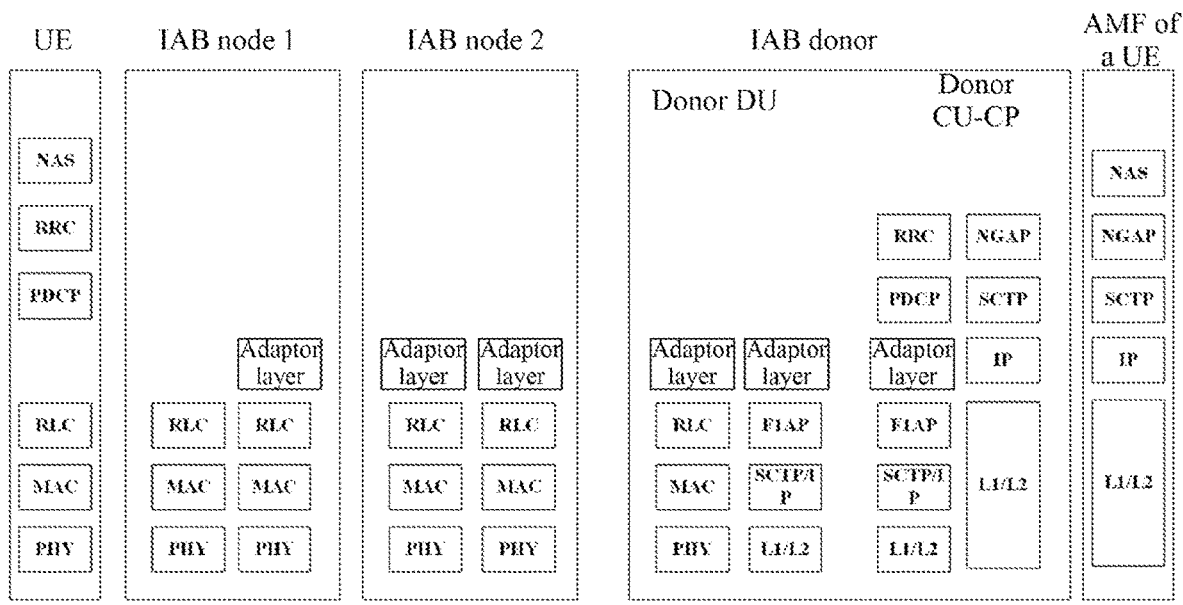
FIG. 12 is a schematic diagram illustrating a protocol stack between a UE and an AMF according to specific embodiment eight of the present application.

Specific Embodiment Eight: Method Two for Sending an NAS/RRC Message Through a CP The method in this specific embodiment is method two for forwarding the NAS/RRC message through the control plane. FIG. 12 is a schematic diagram illustrating a protocol stack between a UE and an AMF according to specific embodiment eight of the present application. As shown in FIG. 12, adaptor layers are located above RLC layers of IAB nodes and above an RLC layer of an IAB donor DU. It is to be noted that the adaptor layer/adaptation layer may also be located between an RLC layer and a MAC layer, or an adaptor layer function is located in the RLC layer or the MAC layer. In addition, the donor CU-CP in FIG. 12 may also be a donor CU, and then the donor CU-CP in this specific embodiment is replaced by the donor CU. The specific embodiment eight differs from specific embodiment two in that the IAB node/donor DU forwards a control plane data packet to the next-hop node through an SRB. The donor DU can determine whether the received uplink data packet is a control plane data packet or a user plane data packet according to a bearing type (i.e., an SRB or a DRB), that is, the donor DU can determine that the received uplink data packet is a control plane data packet after receiving the uplink data packet through the SRB. Other uplink and downlink data forwarding steps in the method of this specific embodiment are similar to those of specific embodiment two.

Figure 13:
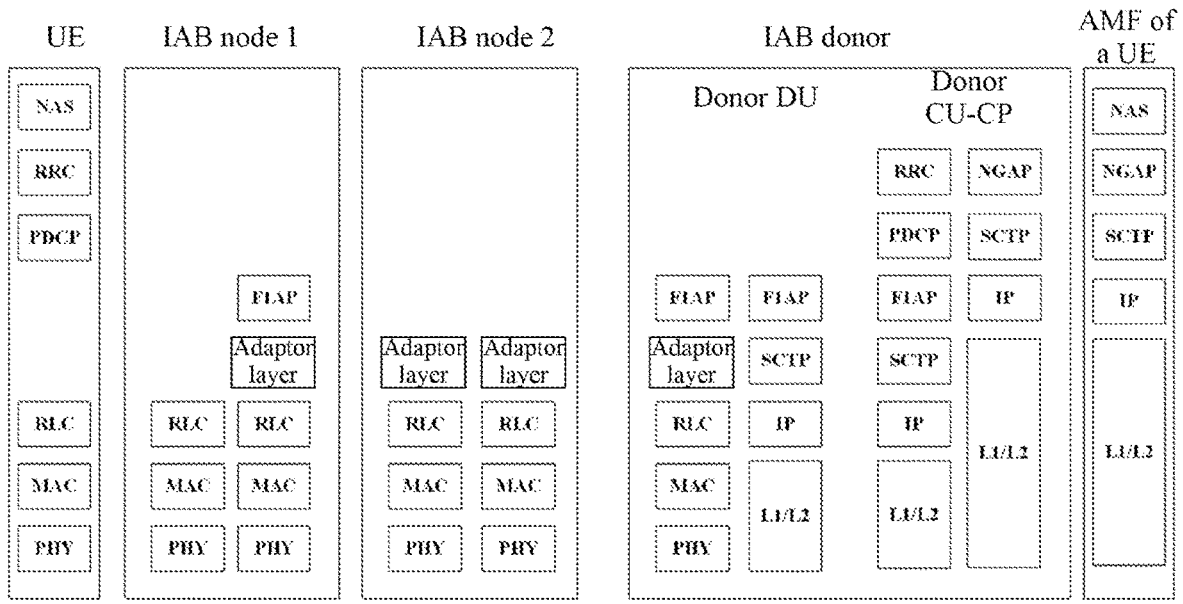
FIG. 13 is a schematic diagram illustrating a protocol stack between a UE and an AMF according to specific embodiment nine of the present application.

Specific Embodiment Nine: Method Three for Sending an NAS/RRC Message Through a CP The method in specific embodiment nine is method three for forwarding the NAS/RRC message through the control plane. FIG. 13 is a schematic diagram illustrating a protocol stack between a UE and an AMF according to specific embodiment nine of the present application. As shown in FIG. 13, adaptor layers are located above RLC layers of IAB nodes and above an RLC layer of an IAB donor DU. It is to be noted that the adaptor layer/adaptation layer may also be located between an RLC layer and a MAC layer, or an adaptor layer function is located in the RLC layer or the MAC layer. In addition, the donor CU-CP in FIG. 13 may also be a donor CU, and then the donor CU-CP in this specific embodiment is replaced by the donor CU. In the method of this specific embodiment, the SCTP/IP layer is replaced by an adaptor layer. It is to be noted that the SCTP/IP layer may exist between an F1AP protocol layer and the adaptor layer. In addition, it is possible that no F1AP layer exists on the donor DU, that is, the donor DU does not perform F1AP protocol layer processing.

The specific embodiment nine differs from specific embodiment three in that the IAB node/donor DU forwards a control plane data packet to the next-hop node through an SRB. The donor DU can determine whether the received uplink data packet is a control plane data packet or a user plane data packet according to a bearing type (i.e., an SRB or a DRB), that is, the donor DU can determine that the received uplink data packet is a control plane data packet after receiving the uplink data packet through the SRB. Other uplink and downlink data forwarding steps in the method of this specific embodiment are similar to those of specific embodiment two.

Specific Embodiment Ten: Method for Sending an F1AP Message Through a CP

Figure 14:
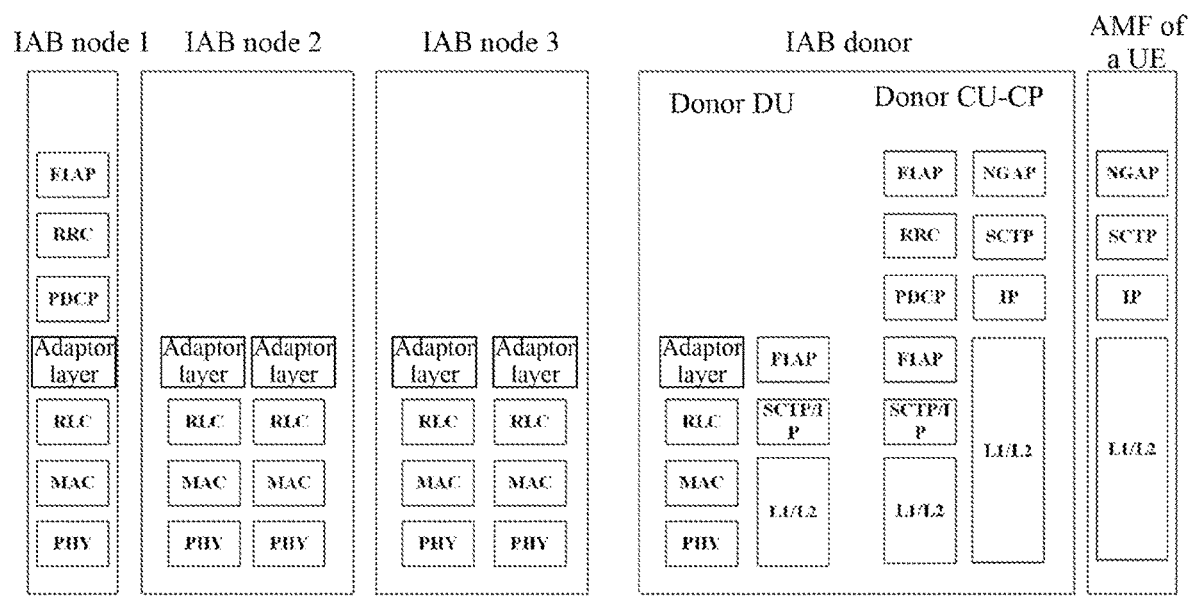
FIG. 14 is a schematic diagram illustrating a protocol stack between IAB node 1 and an AMF according to specific embodiment ten of the present application.

The method in specific embodiment ten is a method for forwarding the F1AP message through the control plane. FIG. 14 is a schematic diagram illustrating a protocol stack between IAB node 1 and an AMF according to specific embodiment ten of the present application. As shown in FIG.

14, adaptor layers are located above RLC layers of IAB nodes and above an RLC layer of an IAB donor DU. It is to be noted that the adaptor layer/adaptation layer may also be located between an RLC layer and a MAC layer, or an adaptor layer function is located in the RLC layer or the MAC layer. In addition, the donor CU-CP in FIG. 14 may also be a donor CU, and then the donor CU-CP in this specific embodiment is replaced by the donor CU. In addition, an adaptor layer may also exist over the interface between the donor DU and the CU-CP, that is, the donor DU and the CU-CP perform adaptor layer processing and encapsulation. In the method of this specific embodiment shown in FIG. 14, the F1AP/SCTP/IP layer is replaced by an adaptor layer. Alternatively, an F1AP layer may exist above the adaptor layer, and further, an SCTP/IP layer may present in front of the F1AP and adaptor layers.

An uplink data forwarding process using the method of this specific embodiment is described below. It is to be noted that steps described below may be used in any combination.

Step one: The F1AP message generated by IAB node 1 is sent through the SRB of IAB node 1. IAB node 1 performs adaptor layer encapsulation. The adaptor layer header includes at least one of: target node information; a UE identifier (of the MT part of IAB node 1) of a data packet; a bearer identifier of a data packet; a channel identifier of a data packet; routing path information; QoS-related information; GTP tunnel information; F1AP ID information; control plane indication information; user plane indication information; or protocol type indication information.

Alternatively, the UE identifier of the MT part of IAB node 1 included in the adaptor layer header may be allocated by using methods described below.

Allocation method one: If the UE ID included in the adapt is allocated by the CU-CP, the CU-CP sends the UE ID to the MT part (e.g., MAC layer control information and an RRC message) of IAB node 1. Alternatively, the CU-CP sends the mapping relationship between an F1AP ID and a UE ID to the donor DU (e.g., through F1 signaling).

Allocation method two: If the UE ID included in the adapt is allocated by IAB node 2, IAB node 2 sends the UE ID to the MT part of IAB node 1 (e.g., through MAC control information). Alternatively, IAB node 2 sends the UE ID to the CU-CP through, for example, F1 signaling. Alternatively, the CU-CP configures the mapping relationship between a UE ID and an F1AP ID for the donor DU.

Step two: The data packet sent by IAB node 1 is forwarded by IAB node 2 and IAB node 3 to the donor DU. The donor DU receives the data packet through the control plane and then sends the data packet to the CU-CP via an F1-C interface.

Alternatively, the donor DU may determine a target node of the data packet by using the method described below.

Determination method one: The CU-CP configures target CU-CP information for IAB node 1, and IAB node 1 carries the target CU-CP information in the adaptor layer header.

Determination method two: The CU-CP configures donor DU information and UE identifier information for IAB node 1, and the IAB node 1 carries donor DU identifier or address information and the UE identifier information in the adaptor layer header. The donor DU determines the target CU-CP node of the data packet according to a mapping relationship between the CU-CP identifier and the UE identifier configured (e.g., configured by the CU or the CU-CP).

Step three: The donor DU sends the control plane data packet received from the SRB to the CU or the CU-CP via the F1-C interface. Alternatively, the F1AP message sent by the donor DU to the CU-CP includes the UE identifier (of the MT part of IAB node 1) and the SRB ID. Alternatively, the UE identifier may be an F1AP ID, such as an F1AP ID obtained from the adaptor layer header of the received data packet.

Alternatively, the donor DU determines the F1AP ID corresponding to the ID of the UE to which the data packet belongs according to the mapping relationship between the F1AP ID and the UE identifier configured (e.g., configured by the CU or the CU-CP). The donor DU then includes the F1AP ID determined through the mapping relationship and the SRB ID obtained from the adaptor layer header into the F1AP message sent to the CU-CP.

Alternatively, the donor DU determines the F1AP ID corresponding to the UE identifier and bearer of the data packet according to a mapping relationship between the F1AP ID and a combination of the SRB ID and the UE identifier configured (e.g., configured by the CU or the CU-CP). The donor DU then includes the F1AP ID determined through the mapping relationship into the F1AP message sent to the CU-CP.

Alternatively, in step one of the uplink data forwarding process of the method in this embodiment, IAB node 1 may not perform adaptor layer processing on the F1 message generated by IAB node 1 itself, that is, no adaptor layer header is added, and IAB node 2 needs to add the adaptor layer header to the data. In this case, IAB node 1 may send the F1AP message and RRC message generated by IAB node 1 itself through a newly defined SRB (or set one used for indicating that the next-hop IAB node does not parse the adaptor layer but is required to encapsulate the adaptor layer).

A downlink data forwarding process using the method of this specific embodiment is described below. It is to be noted that steps described below may be used in any combination.

Step one: The donor CU-CP encapsulates the F1AP message in an RRC message, then performs F1AP encapsulation on the RRC message to form a new F1AP message, and sends the new F1AP message to the donor DU via the F1-C interface. Alternatively, the F1AP message includes at least one of: target node information; a UE identifier of the data packet; a bearer identifier of the data packet; a channel identifier of the data packet; routing path information; QoS-related information; GTP tunnel information; F1AP ID information; control plane indication information; user plane indication information; or protocol type indication information. Alternatively, the target address included by the CU-CP in an IP layer is the IP address of IAB node 1.

Step two: The donor DU parses the received F1AP message and then performs adaptor layer encapsulation. The adaptor layer header includes at least one of: target node information, a UE identifier of a data packet, a bearer identifier of a data packet, a channel identifier of a data packet, routing path information, QoS-related information, GTP tunnel information, F1AP ID information, control plane indication information, user plane indication information, or protocol type indication information.

The donor DU may determine target node information by using methods described below.

Determination method one: The donor DU determines the target IAB node of the data packet according to the mapping relationship between target node information and a UE identifier configured (e.g., configured by the CU or the CU-CP), where the target node information may be information such as a base station identifier, a DU identifier, an IP address, and an IP address index.

Determination method two: The donor DU obtains target IP address information from the IP layer of the received data packet.

Determination method three: The donor DU obtains target IP address information from the IP layer of the received data packet, and then determines the target node information according to the configured mapping relationship between an IP address and target node information.

Alternatively, the donor DU determines the UE identifier of the UE to which the data packet belongs according to the mapping relationship between an F1AP ID and a UE identifier configured (e.g., configured by the CU or the CU-CP). Alternatively, the donor DU determines the UE identifier and bearer identifier of the data packet according to a mapping relationship between an F1AP ID and a combination of an SRB ID and a UE identifier configured (e.g., configured by the CU or the CU-CP).

Step three: The donor DU sends, through an SRB or a control plane RLC channel, a control plane data packet received from the CU-CP to IAB node 3.

Step four: IAB node 3 sends the received data packet to the next-hop node, i.e., IAB node 2, according to information in an adaptor layer header.

Step five: IAB node 2 determines the UE and bearer to which the data packet belongs according to the information in the adaptor layer header, and sends the data packet to the corresponding MT part of IAB node 1 through the SRB.

The full spellings of abbreviations used in the present application are listed below.

The full spelling of IAB is integrated access and backhaul.
The full spelling of SRB is signaling radio bearer.
The full spelling of DRB is data radio bearer.
The full spellings of CU and DU are centralized unit and distributed unit, respectively.
adaptor layer;
The full spelling of SDAP is Service Data Adaptation Protocol.
packet filter;
Packet Filter Set;
The full spellings of MN and SN are master node and secondary node, respectively.
split bearer;
The full spelling of SCG is secondary cell group.
The full spelling of MN is terminated SCG bearer.
The full spelling of MCG is master cell group.
SN terminated MCG bearer;
The full spelling of MT is Mobile Termination.
The full spelling of LCID is logical channel ID.
The full spelling of RBID is radio bearer ID.
The full spelling of UPF is User Plane Function.
The full spelling of AMF is Access and Mobility Management Function.

From the description of the embodiments described above, it will be apparent to those skilled in the art that the methods in the embodiments described above may be implemented by software plus a necessary general-purpose hardware platform, or may of course be implemented by hardware. However, in many cases, the former is a preferred implementation. Based on this understanding, the scheme provided by the present application substantially, or the part contributing to the existing art, may be embodied in the form of a software product. The computer software product is stored on a storage medium (such as a ROM/RAM, a magnetic disk or an optical disk) and includes several instructions for enabling a terminal device (which may be a mobile phone, a computer, a server or a network device) to perform the method according to each embodiment of the present application.

Embodiment Two

An information transmission apparatus is further provided in this embodiment. The apparatus is configured to implement the above-mentioned embodiments and implementations. What has been described will not be repeated. As used below, the term "module" may be software, hardware or a combination thereof capable of implementing predetermined functions. The apparatus described below in this embodiment is implemented by software, but implementation by hardware or by a combination of software and hardware is also possible and conceived.

According to an embodiment of the present application, an information transmission apparatus is further provided and is applied to a first integrated access and backhaul (IAB) node. The apparatus includes a first acquisition module and a first sending module.

The first acquisition module is configured to acquire a first data packet.

The first sending module is configured to send the first data packet to an IAB donor.

Alternatively, the step in which the first IAB node acquires the first data packet includes one of the following steps: the first IAB node receives the first data packet sent by a UE; the first IAB node generates the first data packet; or the first IAB node receives the first data packet sent by a second IAB node. Here, three forms in which the IAB acquires the first data packet are exemplified, and are not intended to limit the present application.

Alternatively, the step in which the first IAB node sends the first data packet to the IAB donor includes one of the following steps: the first IAB node sends the first data packet to the IAB donor; or the first IAB node sends the first data packet to a next-hop node and the next-hop node forwards the first data packet to the IAB donor. The step in which the first IAB node sends the first data packet to the IAB donor may be understood as a step in which the first IAB node directly sends the first data packet to the IAB donor without forwarding through an intermediate one-hop node or multi-hop node.

Alternatively, the step in which the first IAB node sends the first data packet to the IAB donor includes one of the following steps: the first IAB node sends the first data packet to the IAB donor through a control plane logical channel or a control plane bearer; or the first IAB node sends the first data packet to the IAB donor through a user plane logical channel or a user plane bearer.

Alternatively, after the first IAB node acquires the first data packet, the first IAB node adds an adaptor layer header to the first data packet, where the adaptor layer header includes at least one of: target node information; a UE identifier of the first data packet; a bearer identifier of the first data packet; a channel identifier of the first data packet; routing path information; Quality of serviuce (QoS) information; GPRS tunneling protocol (GTP) tunnel information; FLAP ID information (where the ID information may be identifier information); control plane indication information; user plane indication information; protocol type indication information, long-format indication information, or short-format indication information.

It is to be added that the IAB donor or IAB node to which a data packet is finally sent is referred to as a target node, and a node between a current IAB node and the target node may be referred to as the one-hop node or multi-hop node.

Alternatively, the target node information includes, but is not limited to, a target node identifier such as an IAB node identifier, a DU identifier, a CU identifier, a base station identifier, a CU-UP identifier, a CU-CP identifier, an AMF identifier, a cell identifier and a target index number; or the IP address of the target node; or the IP address index information of the target node; or next-hop node information.

Alternatively, the UE identifier information of the data packet is the UE identifier of the UE to which the data packet belongs or the UE identifier of the IAB node to which the data packet belongs; further, the UE identifier includes, but is not limited to, an E1AP ID, an F1AP ID, a C-RNTI, an S1 AP ID, an X2 AP ID, an NG AP ID, an Xn AP ID, and a newly defined identifier.

Alternatively, the bearer/channel identifier information of the data packet is the identifier of the bearer/channel of the UE to which the data packet belongs, or the identifier of the bearer/channel of the IAB node to which the data packet belongs. The bearer identifier is one of: a DRB ID, an SRB ID, an LCID, a QFI, or a flow identifier.

Alternatively, the routing path information includes, but is not limited to, a routing path identifier, a routing path number, and a routing path index number.

Alternatively, the QoS-related information includes, but is not limited to, a QCI, 5QI, QFI, or DSCP value.

Alternatively, the GTP tunnel information includes a TNL address and/or GTP TEID information.

Alternatively, the protocol type indication information includes, but is not limited to, an RRC message, an NAS message, an F1AP message, and OAM information.

Alternatively, the long-format indication information is used for indicating that the adaptor layer header includes information other than the long-format indication information; the short-format indication information is used for indicating that the adaptor layer header includes only the short-format indication information.

Alternatively, before the first IAB node adds the adaptor layer header to the first data packet, the apparatus further includes the first IAB node encapsulates the first data packet into an F1AP message, where the encapsulated F1AP message includes at least one of: an F1AP ID, the UE identifier of the first data packet, the bearer identifier of the first data packet, or the channel identifier of the first data packet. The UE identifier of the first data packet may be the identifier of the UE that sends the first data packet or UE that generates the first data packet.

Alternatively, the IAB donor includes at least one of: an IAB donor base station; an IAB donor centralized unit (CU); an IAB donor distributed unit (DU); an IAB donor CU-user plane (UP); or an IAB donor CU-control plane (CP).

Alternatively, the first data packet is a user plane data packet or a control plane data packet, and may specifically be an NAS message, an RRC message, an F1 message, S1 signaling, X2 signaling, NG signaling, Xn signaling, or OAM information.

According to an embodiment of the present application, an apparatus for transmitting IAB control plane information is further provided and is applied to an IAB donor distributed unit (DU). The apparatus includes a second receiving module and a second sending module.

The second receiving module is configured to receive a control plane data packet sent by a first IAB node.

The second sending module is configured to send the control plane data packet to a target centralized unit (CU) or a target CU-control plane (CP), or forward the control plane data packet to a target CU-CP through a CU-user plane (UP).

According to an embodiment of the present application, an information transmission apparatus is further provided and is applied to an integrated access and backhaul (IAB) donor. The apparatus includes a first determination module and a third sending module.

The first determination module is configured to receive a second data packet or generate a second data packet.

The third sending module is configured to send the second data packet to a fourth IAB node through a one-hop node or a multi-hop node.

Alternatively, the step in which the IAB donor sends the second data packet to the fourth IAB node through the one-hop node or the multi-hop node includes the following step: the IAB donor sends the second data packet through an F1 GTP-U data packet, an F1AP message or an E1AP message, and a next-hop node forwards the second data packet to the fourth IAB node.

Alternatively, the F1 GTP-U data packet, the F1AP message or the E1AP message includes at least one of: target node information; a UE identifier of the second data packet; a bearer identifier of the second data packet; a channel identifier of the second data packet; routing path information; QoS information; GTP tunnel information; F1AP ID information; control plane indication information; user plane indication information; or protocol type indication information.

Alternatively, after the IAB donor sends the second data packet through the F1 GTP-U data packet, the F1AP message or the E1AP message to the next-hop node, the next-hop node adds an adaptor layer header to the data packet, where the adaptor layer header includes at least one of: target node information; a UE identifier of the second data packet; a bearer identifier of the second data packet; a channel identifier of the second data packet; routing path information; QoS-related information; GTP tunnel information; F1AP ID information; control plane indication information; user plane indication information; or protocol type indication information.

Alternatively, the target node information includes, but is not limited to, a target node identifier such as an IAB node identifier, a DU identifier, a CU identifier, a base station identifier, a CU-UP identifier, a CU-CP identifier, an AMF identifier, a cell identifier and a target index number; or the IP address of the target node; or the IP address index information of the target node; or next-hop node information.

Alternatively, the UE identifier information of the data packet is the UE identifier of the UE to which the data packet belongs or the UE identifier of the IAB node to which the data packet belongs; further, the UE identifier includes, but is not limited to, an E1AP ID, an F1AP ID, a C-RNTI, an S1 AP ID, an X2 AP ID, an NG AP ID, an Xn AP ID, and a newly defined identifier.

Alternatively, the bearer/channel identifier information of the data packet is the identifier of the bearer/channel of the UE to which the data packet belongs, or the identifier of the bearer/channel of the IAB node to which the data packet belongs. The bearer identifier is one of: a DRB ID, an SRB ID, an LCID, a QFI, or a flow identifier.

Alternatively, the routing path information includes, but is not limited to, a routing path identifier, a routing path number, and a routing path index number.

Alternatively, the QoS-related information includes, but is not limited to, a QCI, 5QI, QFI, or DSCP value.

Alternatively, the GTP tunnel information includes a TNL address and/or GTP TEID information.

Alternatively, the protocol type indication information includes, but is not limited to, an RRC message, an NAS message, an F1AP message, and OAM information.

According to an embodiment of the present application, an information acquisition apparatus is further provided and is applied to a first integrated access and backhaul (IAB) node. The apparatus includes a second acquisition module and a second determination module.

The second acquisition module is configured to obtain first configuration information, where the first configuration information includes at least one of: target node information; next-hop node information; or routing path information.

The second determination module is configured to determine, according to the first configuration information, a next-hop node to which a data packet is forwarded.

Alternatively, the step in which the IAB node obtains the first configuration information includes the IAB node obtains the first configuration information from a CU or a CU-CP through an F1 message.

According to an embodiment of the present application, an apparatus for acquiring IAB control plane information is further provided and is applied to an IAB donor DU. The apparatus includes a third acquisition module and a third determination module.

The third acquisition module is configured to obtain second configuration information, where the second configuration information includes at least one of:
 a mapping relationship between a UE identifier and an F1AP ID;
 a mapping relationship between a signaling radio bearer (SRB) of a UE and an F1AP ID;
 a mapping relationship between a UE identifier and a CU identifier;
 a mapping relationship between an IP address and target node information;
 a mapping relationship between a UE identifier and a CU-CP identifier;
 a mapping relationship between a UE identifier and a base station identifier;
 a mapping relationship between a UE identifier and an IAB node identifier;
 a mapping relationship between an F1 GTP-U tunnel and CU-CP node information;
 a mapping relationship between an F1 GTP-U tunnel and target node information;
 a mapping relationship between a UE identifier and target node information; or
 a mapping relationship between an SRB of a UE and an F1 GTP-U tunnel.

The third determination module is configured to forward a data packet according to the second configuration information.

According to an embodiment of the present application, an apparatus for acquiring IAB control plane information is further provided and is applied to an integrated access and backhaul (IAB) donor centralized unit (CU)-user plane (UP). The apparatus includes a fourth acquisition module and a forwarding module.

Alternatively, the step in which the integrated access and backhaul distributed unit (IAB donor DU) obtains the second configuration information includes the IAB donor DU obtains the second configuration information from a CU or a CU-CP through an F1 message.

The fourth acquisition module is configured to obtain third configuration information, where the third configuration information includes at least one of:
 a mapping relationship between a UE identifier and an F1AP ID;
 a mapping relationship between a signaling radio bearer (SRB) of a UE and an F1AP ID;
 a mapping relationship between a UE identifier and a CU identifier;
 a mapping relationship between an IP address of a received data packet and target node information;
 a mapping relationship between a UE identifier and a CU-CP identifier;
 a mapping relationship between a UE identifier and a base station identifier/an IP address;
 a mapping relationship between a UE identifier and an IAB node identifier;
 a mapping relationship between an F1 GTP-U tunnel and CU-CP node information;
 a mapping relationship between an SRB of a UE and an F1 GTP-U tunnel;
 a mapping relationship between an F1 GTP-U tunnel and target node information; or
 a mapping relationship between a UE identifier and target node information.

The forwarding module is configured to forward a data packet according to the third configuration information.

According to an embodiment of the present application, an information transmission apparatus is further provided and is applied to an IAB donor CU-UP or an IAB donor DU. The apparatus includes a first transmission module.

The first transmission module is configured to transmit a data packet between the IAB donor CU-UP and the IAB donor DU, where the data packet includes a GTP-U header, and the GTP-U header includes at least one of: UE identifier information; bearer identifier information; target node information; control plane indication information; user plane indication information; routing path information; QoS-related information; GTP tunnel information; F1AP ID information; or protocol type indication information.

According to an embodiment of the present application, an information transmission apparatus is further provided and is applied to an IAB donor DU or an IAB donor CU-CP. The apparatus includes a second transmission module.

The second transmission module is configured to transmit an F1AP message between the IAB donor DU and the IAB donor CU-CP, where the F1AP message includes at least one of: UE identifier information; bearer identifier information; target node information; control plane indication information; user plane indication information; routing path information; QoS-related information; GTP tunnel information; F1AP ID information; or protocol type indication information.

According to an embodiment of the present application, an information transmission apparatus is further provided and is applied to an IAB donor CU-UP or an IAB donor CU-CP. The apparatus includes a third transmission module.

The third transmission module is configured to transmit an E1 AP message between the IAB donor CU-UP and the IAB donor CU-CP, where the E1 AP message includes at least one of: UE identifier information; bearer identifier information; target node information; control plane indication information; user plane indication information; routing path information; QoS-related information; GTP tunnel information; F1AP ID information; or protocol type indication information.

It is to be noted that each module described above may be implemented by software or hardware. An implementation by hardware may, but not necessarily, be performed in the following manners: the various modules described above are located in the same processor, or the various modules described above are located in their respective processors in any combination form.

Embodiment Three

According to another embodiment of the present application, a storage medium is further provided. The storage medium is configured to store a computer program, where the computer program, when executed, performs the method described in any embodiment described above.

Embodiment Four

According to another embodiment of the present application, an electronic apparatus is further provided. The electronic apparatus includes a memory and a processor. The memory is configured to store a computer program and the processor is configured to execute the computer program for performing the steps in any method embodiment described above.

Apparently, it should be understood by those skilled in the art that each of the modules or steps of the present application described above may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present application is not limited to any particular combination of hardware and software.

The above are merely preferred embodiments of the present application and are not intended to limit the present application. For those skilled in the art, the present application may have various modifications and variations. Any modifications, equivalent substitutions, improvements and the like made within the spirit and principle of the present application should fall within the scope of the present application.

What is claimed is:

1. An information transmission method in an integrated access and backhaul (IAB) architecture, comprising:
    acquiring, by a first IAB node, a data packet; and
    sending, by the first IAB node, the data packet to an IAB donor;
    wherein acquiring, by the first IAB node, the data packet comprises one of:
    receiving, by the first IAB node, the data packet sent by a user equipment (UE); or
    generating, by the first IAB node, the data packet;
    wherein sending, by the first IAB node, the data packet to the IAB donor comprises one of:
    sending, by the first IAB node, the data packet to the IAB donor; or
    sending, by the first IAB node, the data packet to a next-hop node, and forwarding, by the next-hop node, the data packet to the IAB donor;
    wherein after acquiring, by the first IAB node, the data packet, the method further comprises: adding, by the first IAB node, an adaptor layer header to the data packet, wherein the adaptor layer header comprises at least one of:
    target node information; routing path information; control plane indication information; or user plane indication information;
    wherein the data packet is a user plane data packet or a control plane data packet;
    wherein the method further comprises:
    obtaining, by the first IAB node, configuration information, wherein the configuration information comprises at least one of: target node information; next-hop node information; or routing path information; and
    determining, by the first IAB node according to the configuration information, a next-hop node to which a data packet is forwarded;
    wherein obtaining, by the first IAB node, the configuration information comprises:
    obtaining, by the first IAB node, the configuration information from a centralized unit (CU) or a CU-control plane (CU-CP) through an F1 message.

2. An information transmission method in an integrated access and backhaul (IAB) architecture, comprising:
    receiving or generating, by an IAB donor, a data packet; and
    sending, by the IAB donor, the data packet to a first IAB node through a one-hop node or a multi-hop node;
    wherein sending, by the IAB donor, the data packet to the first IAB node through the one-hop node or the multi-hop node comprises:
    sending, by the IAB donor, the data packet through an F1 general packet radio service (GPRS) tunneling protocol (GTP)-user plane (GTP-U) data packet or an F1AP message to a next-hop node, and forwarding, by the next-hop node, the data packet to the IAB first node;
    wherein the method further comprises: after sending, by the IAB donor, the data packet through the F1 GTP-U data packet or the F1AP message to the next-hop node, adding, by the next-hop node, an adaptor layer header to the data packet;
    wherein the adaptor layer header comprises at least one of:
    target node information; routing path information; control plane indication information; or user plane indication information;
    wherein the next-hop node comprises an IAB donor distributed unit (DU), the method further comprises:
    obtaining, by the IAB donor DU, configuration information, wherein the configuration information comprises: a mapping relationship between an Internet Protocol (IP) address and target node information, wherein the target node information comprises a target node identifier or next-hop node information; and
    forwarding, by the IAB donor DU, a data packet according to the configuration information;
    wherein obtaining, by the IAB donor DU, the configuration information comprises:
    obtaining, by the IAB donor DU, the configuration information from a centralized unit, CU, or a CU-control plane, CU-CP, through an F1 message.

3. An information transmission apparatus in an integrated access and backhaul (IAB) architecture, applied to a first IAB node comprising a memory and a processor, wherein the memory is configured to store a computer program, the processor is configured to execute the computer program to perform the method of claim 1, and the processor comprises:

an acquisition module, which is configured to acquire a data packet; and a sending module, which is configured to send the data packet to an IAB donor;

wherein the acquisition module is configured to:

receive the data packet sent by a user equipment (UE); or generate the data packet;

and the sending module is configured to:

send the data packet to the IAB donor; or send the data packet to a next-hop node, and forward the data packet to the IAB donor;

wherein the sending module is further configured to add an adaptor layer header to the data packet; wherein the adaptor layer header comprises at least one of:

target node information; routing path information; control plane indication information; or user plane indication information;

wherein the data packet is a user plane data packet or a control plane data packet;

wherein the apparatus further comprises:

an acquisition module, which is configured to obtain configuration information, wherein the configuration information comprises at least one of: target node information; next-hop node information; or routing path information; and a determination module, which is configured to determine, according to the configuration information, a next-hop node to which a data packet is forwarded;

wherein the acquisition module is configured to obtain the configuration information from a centralized unit (CU) or a CU-control plane (CU-CP) through an F1 message.

4. An information transmission apparatus in an integrated access and backhaul (IAB) architecture, applied to an IAB donor comprising a memory and a processor, wherein the memory is configured to store a computer program, the processor is configured to execute the computer program to perform the method of claim 2, and the processor comprises:

a determination module, which is configured to receive a data packet or generate a data packet; and a sending module, which is configured to send the data packet to a first IAB node through a one-hop node or a multi-hop node;

wherein the sending module is configured to send the data packet through an F1 general packet radio service (GPRS) tunneling protocol (GTP)-user plane (GTP-U) data packet or an F1AP message to a next-hop node for the next-hop node forwarding the data packet to the first IAB node; and the sending module is configured to add an adaptor layer header to the data packet;

wherein the adaptor layer header comprises at least one of:

target node information; routing path information; control plane indication information; or user plane indication information;

wherein the next-hop node comprises an IAB donor distributed unit (DU), the apparatus further comprises:

an acquisition module, which is configured to obtain configuration information, wherein the configuration information comprises: a mapping relationship between an Internet Protocol (IP) address and target node information, wherein the target node information comprises a target node identifier or next-hop node information; and a determination module, which is configured to forward a data packet according to the configuration information;

wherein the acquisition module is configured to obtain the configuration information from a centralized unit (CU) or a CU-control plane (CU-CP) through an F1 message.

5. A storage medium, wherein the storage medium is configured to store a computer program, and the computer program, when executed, performs the method of claim 1.

6. An electronic device, comprising a memory and a processor, wherein the memory is configured to store a computer program, and the processor is configured to execute the computer program to perform the method of claim 1.

7. A storage medium, wherein the storage medium is configured to store a computer program, and the computer program, when executed, performs the method of claim 2.

8. An electronic device, comprising a memory and a processor, wherein the memory is configured to store a computer program, and the processor is configured to execute the computer program to perform the method of claim 2.

\* \* \* \* \*